(12) United States Patent
Jung et al.

(10) Patent No.: US 8,271,449 B2
(45) Date of Patent: *Sep. 18, 2012

(54) AGGREGATION AND RETRIEVAL OF MOTE NETWORK DATA

(75) Inventors: Edward K. Y. Jung, Bellevue, WA (US); Clarence T. Tegreene, Bellevue, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 821 days.

This patent is subject to a terminal disclaimer.

(21) Appl. No.: 12/286,736

(22) Filed: Sep. 30, 2008

(65) Prior Publication Data

US 2009/0119267 A1    May 7, 2009

Related U.S. Application Data

(63) Continuation of application No. 10/903,692, filed on Jul. 30, 2004, now Pat. No. 7,457,834, and a continuation-in-part of application No. 10/909,200, filed on Jul. 30, 2004, and a continuation-in-part of application No. 10/903,652, filed on Jul. 30, 2004, now Pat. No. 7,536,388.

(51) Int. Cl.
*G06F 7/00* (2006.01)
*G06F 17/00* (2006.01)

(52) U.S. Cl. .................................................... 707/661

(58) Field of Classification Search ................... 707/661
See application file for complete search history.

(56) References Cited

U.S. PATENT DOCUMENTS

| | | |
|---|---|---|
| 4,308,911 A | 1/1982 | Mandl |
| 4,761,641 A | 8/1988 | Schreiber |
| 5,159,631 A | 10/1992 | Quan et al. |
| 5,321,396 A | 6/1994 | Lamming et al. |
| 5,394,882 A | 3/1995 | Mawhinney |
| 5,432,519 A | 7/1995 | Sezai |
| 5,539,665 A | 7/1996 | Lamming et al. |
| 5,581,694 A | 12/1996 | Iverson et al. |
| 5,615,367 A | 3/1997 | Bennett et al. |
| 5,697,066 A | 12/1997 | Acampora |
| 5,796,951 A | 8/1998 | Hamner et al. |
| 5,960,214 A | 9/1999 | Sharpe, Jr. et al. |
| 6,088,665 A | 7/2000 | Burns et al. |
| 6,124,806 A | 9/2000 | Cunningham et al. |
| 6,131,119 A | 10/2000 | Fukui |
| 6,187,483 B1 | 2/2001 | Capodieci et al. |
| 6,208,247 B1 | 3/2001 | Agre et al. |
| 6,229,486 B1 | 5/2001 | Krile |
| 6,296,205 B1 | 10/2001 | Hanson et al. |
| 6,344,797 B1 | 2/2002 | Hosny |
| 6,421,354 B1 | 7/2002 | Godlewski |
| 6,504,829 B1 | 1/2003 | Young et al. |

(Continued)

OTHER PUBLICATIONS

U.S. Appl. No. 11/998,847, Tegreene, Clarence T.

(Continued)

*Primary Examiner* — Robert Beausoliel, Jr.
*Assistant Examiner* — Nicholas Allen

(57) ABSTRACT

Methods, devices, and systems that aggregate and retrieve network sensor data. In one approach, an exemplary method includes receiving a plurality of instances of correlated sensor data from a plurality of remote data storages, each instance of sensor data respectively correlating to an occurrence. In another approach, an exemplary method includes receiving from an input-selector an input selection corresponding to a target-occurrence having at least one representative feature, and searching stored sensor data for sensor data correlating to the target-occurrence.

48 Claims, 13 Drawing Sheets

U.S. PATENT DOCUMENTS

| | | | |
|---|---|---|---|
| 6,505,205 B1 | 1/2003 | Kothuri et al. |
| 6,510,403 B1 | 1/2003 | Ghaseminejad |
| 6,618,745 B2 | 9/2003 | Christensen et al. |
| 6,640,087 B2 | 10/2003 | Reed et al. |
| 6,640,145 B2 | 10/2003 | Hoffberg et al. |
| 6,691,070 B1 | 2/2004 | Williams et al. |
| 6,697,649 B1 | 2/2004 | Bennet et al. |
| 6,704,742 B1 | 3/2004 | Huth et al. |
| 6,708,239 B1 | 3/2004 | Ellerbrock et al. |
| 6,735,630 B1 | 5/2004 | Gelvin et al. |
| 6,778,844 B2 | 8/2004 | Hood, III |
| 6,792,321 B2 | 9/2004 | Sepe, Jr. |
| 6,826,162 B2 | 11/2004 | Haines et al. |
| 6,856,247 B1 | 2/2005 | Wallace |
| 6,870,503 B2 | 3/2005 | Mohamadi |
| 6,888,453 B2 | 5/2005 | Lutz et al. |
| 6,924,727 B2 | 8/2005 | Nagaoka et al. |
| 6,943,747 B2 | 9/2005 | Kwon |
| 6,950,778 B2 | 9/2005 | Warner et al. |
| 6,999,957 B1 | 2/2006 | Zamir et al. |
| 7,004,401 B2 | 2/2006 | Kallestad |
| 7,016,812 B2 | 3/2006 | Aritsuka et al. |
| 7,019,637 B1 | 3/2006 | Johnson et al. |
| 7,034,740 B2 | 4/2006 | Witten |
| 7,075,455 B2 | 7/2006 | Nishimura et al. |
| 7,103,511 B2 | 9/2006 | Petite |
| 7,165,109 B2 | 1/2007 | Chiloyan et al. |
| 7,167,859 B2 | 1/2007 | Shah et al. |
| 7,203,693 B2 | 4/2007 | Carlbom et al. |
| 7,446,801 B2 | 11/2008 | Iizuka |
| 7,472,135 B2 | 12/2008 | Huuskonen |
| 7,475,158 B2 | 1/2009 | Ferri et al. |
| 7,665,126 B2 | 2/2010 | Simon et al. |
| 7,683,933 B2 | 3/2010 | Tanaka |
| 2001/0027495 A1 | 10/2001 | Campagnolo |
| 2002/0027504 A1 | 3/2002 | Davis et al. |
| 2002/0036595 A1 | 3/2002 | Chiang et al. |
| 2002/0040639 A1 | 4/2002 | Duddleson et al. |
| 2002/0095501 A1 | 7/2002 | Chiloyan et al. |
| 2002/0095568 A1 | 7/2002 | Norris |
| 2002/0123864 A1 | 9/2002 | Eryurek et al. |
| 2002/0161751 A1 | 10/2002 | Mulgund et al. |
| 2002/0165933 A1 | 11/2002 | Yu et al. |
| 2003/0014084 A1 | 1/2003 | VanHout |
| 2003/0016128 A1 | 1/2003 | Lutz et al. |
| 2003/0026268 A1 | 2/2003 | Navas |
| 2003/0033394 A1 | 2/2003 | Stine |
| 2003/0058111 A1 | 3/2003 | Lee et al. |
| 2003/0063585 A1 | 4/2003 | Younis et al. |
| 2003/0135495 A1 | 7/2003 | Vagnozzi |
| 2003/0151513 A1 | 8/2003 | Herrmann et al. |
| 2003/0172221 A1 | 9/2003 | McNeil |
| 2003/0222818 A1 | 12/2003 | Regnier et al. |
| 2003/0228857 A1 | 12/2003 | Maeki |
| 2003/0236866 A1 | 12/2003 | Light |
| 2004/0005889 A1 | 1/2004 | Nishimura et al. |
| 2004/0010492 A1 | 1/2004 | Zhao et al. |
| 2004/0071460 A1 | 4/2004 | Nishimura et al. |
| 2004/0075549 A1 | 4/2004 | Haller |
| 2004/0078117 A1 | 4/2004 | Vanderah et al. |
| 2004/0090326 A1 | 5/2004 | Chin et al. |
| 2004/0122849 A1 | 6/2004 | Nelson |
| 2004/0137915 A1 | 7/2004 | Diener et al. |
| 2004/0139110 A1 | 7/2004 | LaMarca et al. |
| 2004/0144849 A1 | 7/2004 | Ahmed |
| 2004/0158627 A1 | 8/2004 | Thornton |
| 2004/0186826 A1 | 9/2004 | Choi et al. |
| 2004/0218602 A1 | 11/2004 | Hrastar et al. |
| 2004/0230638 A1 | 11/2004 | Balachandran et al. |
| 2004/0240542 A1 | 12/2004 | Yeredor et al. |
| 2004/0249563 A1* | 12/2004 | Otsuki et al. ............... 701/200 |
| 2004/0262410 A1 | 12/2004 | Hull |
| 2004/0267729 A1 | 12/2004 | Swaminathan et al. |
| 2005/0021724 A1 | 1/2005 | Kung et al. |
| 2005/0043907 A1 | 2/2005 | Eckel et al. |
| 2005/0062653 A1 | 3/2005 | Cetiner et al. |
| 2005/0085248 A1 | 4/2005 | Ballay et al. |
| 2005/0140964 A1 | 6/2005 | Eschenauer et al. |
| 2005/0141706 A1 | 6/2005 | Regli et al. |
| 2005/0143133 A1 | 6/2005 | Bridgelall |
| 2005/0275532 A1 | 12/2005 | Ferri et al. |
| 2006/0018516 A1 | 1/2006 | Masoud et al. |
| 2006/0053459 A1 | 3/2006 | Simerly et al. |
| 2006/0092042 A1 | 5/2006 | Davis et al. |
| 2006/0136627 A1 | 6/2006 | Maity et al. |
| 2006/0206235 A1 | 9/2006 | Shakes et al. |
| 2006/0212570 A1 | 9/2006 | Aritsuka et al. |
| 2006/0224434 A1 | 10/2006 | Rumi et al. |
| 2007/0035410 A1 | 2/2007 | Cohen et al. |
| 2007/0208841 A1 | 9/2007 | Barone et al. |
| 2007/0214133 A1 | 9/2007 | Liberty et al. |
| 2007/0262863 A1 | 11/2007 | Aritsuka et al. |
| 2008/0003948 A1 | 1/2008 | Mitran |
| 2008/0100450 A1 | 5/2008 | Ayyagari et al. |
| 2008/0129495 A1* | 6/2008 | Hitt ........................ 340/539.26 |
| 2008/0234581 A1 | 9/2008 | Paltieli et al. |
| 2009/0019447 A1 | 1/2009 | Hellerstein et al. |
| 2009/0063187 A1 | 3/2009 | Johnson et al. |
| 2009/0067586 A1 | 3/2009 | Fano et al. |
| 2009/0195401 A1 | 8/2009 | Maroney et al. |
| 2010/0168989 A1 | 7/2010 | Gao et al. |
| 2010/0274753 A1 | 10/2010 | Liberty et al. |

OTHER PUBLICATIONS

U.S. Appl. No. 11/998,879, Tegreene, Clarence T.

Greenstein, Benjamin et al.; "DIFS: A Distributed Index for Features in Sensor Networks"; bearing a date of 2003; pp. 1-11; located at http://lecs.cs.ucla.edu/~ben/papers/difs.pdf; printed on Apr. 6, 2010.

Glaser, Steven D.; "Some real-world applications of wireless sensor nodes"; SPIE Symposium on Smart Structures & Materials/NDE 2004; Mar. 14-18, 2004; pp. 1-12; San Diego, CA.

Adler, Robert et al.; "Demo Abstract: Intel Mote 2: An Advanced Platform for Demanding Sensor Network Applications"; Intel Corporation; bearing dates of Nov. 2-4, 2005; p. 298; (plus cover sheet).

Berkeley Webs: Wireless Embedded Systems, "Publications", pp. 1-3, located at http://webs.cs.berkeley.edu/publications.html, printed on Apr. 12, 2004.

Berkeley Webs: Wireless Embedded Systems, "Tiny OS a component-based OS for the networked sensor regime", "Latest News", pp. 1-2 located at http://webs.cs.berkeley.edu/tos/, printed on Jan. 27, 2004.

Berkeley Webs: Wireless Embedded Systems, "Tiny OS a component-based OS for the networked sensor regime", "Publications/Presentations", pp. 1-3 located at http://www.tinyos.net/media.html, printed on Apr. 13, 2004.

Berkeley Webs: Wireless Embedded Systems, "Tiny OS a component-based OS for the networked sensor regime", "Related UC Berkeley Work", pp. 1-9 located at http://webs.cs.berkeley.edu/tos/related.html, printed on Jan. 27, 2004.

Berkeley Webs: Wireless Embedded Systems, "Tiny OS Tutorial Index", pp. 1-2 located at http://webs.cs.berkeley.edu/tos/tinyos-1.x/doc/tutorial/index.html, printed on Apr. 15, 2004.

Berkeley Webs: Wireless Embedded Systems, "Tiny OS Tutorial Lesson 8: Data Logging Application", pp. 1-4 located at http://webs.cs.berkeley.edu/tos/tinyos-1.x/doc/tutorial/lesson8.html, printed on Apr. 15, 2004.

Berkely Webs: Wireless Embedded Systems, "Building Sensor Networks with TinyOS" May 5, 2003 Mobisys Tutorial, San Francisco Powerpoint Presentation, Culler, David; Levis, Phil; Szewczyk, Rob; Polastre, Joe; pp. 1-41 located at http://webs.cs.berkeley.edu, printed on Apr. 15, 2004.

Buonadonna, Phillip; Hill, Jason; Culler, David; "Active Message Communication for Tiny Networked Sensors," pp. 1-11, printed on Mar. 8, 2004.

Center for the Built Environment, "XYZ on a Chip: Integrated Wireless Sensor Networks for the Control of the Indoor Environment in Buildings" pp. 1-2, located at http://www.cbe.berkeley.edu/research/briefs-wirelessxyz.htm, bearing a date of 2002, printed on Jan. 27, 2004.

Citris, "Brainy Buildings Conserve Energy" p. 1-3 located at http://www.citris.berkeley.edu/applications/energy/smartbuildings.html, printed on Jan. 27, 2004.

Citris, "The Real World as One Giant Database" pp. 1-3 located at http://www.citris.berkeley.edu/newsletter/2003_Newsletters/december_2003/feature.htm, bearing a date of 2003, printed on Apr. 9, 2004.

Culler, et al., "Building Sensor Networks with TinyOS," 2003, pp. 1-41; http://webs.cs.berkeley.edu.

Culler, David E.; Mulder, Hans; "Smart Sensors to Network the World"; Scientific American; printed on Jun. 26, 2007; pp. 1-10; http://www.intel.com/research/exploratory/smartnetworks.htm.

Culler, David; Estrin, Deborah; Srivastava, Mani; "Overview of Sensor Networks"; Computer; Aug. 2004; pp. 41-49; vol. 37; No. 8; IEEE Computer Society.

"Data Repository", University of California Berkeley, located at http://localization.millennium.berkeley.edu/data_repository.html, pp. 1 of 1, bearing a date of 2001, printed on Apr. 7, 2004.

Dutta, Prabal K. et al.; "System Software Techniques for Low-Power Operation in Wireless Sensor Networks"; Computer Science Division, University of California, Berkeley; bearing a date of 2005; pp. 924-931; (plus cover sheet).

Gay, David; Levis, Phil; Von Behren; Welsh, Matt; Brewer, Eric; and Culler, David, "The nesCLanguage: A Holistic Approach to Network Embedded Systems," pp. 1-10; Intel Research Berkeley, The Intel Corporation, Nov. 2002.

Gelsinger, Pat; Intel.com, "Expanding Moore's Law with Convergence" pp. 1-4 located at http://www.intel.com/labs/features/em101031.htm, printed on Apr. 9, 2004.

Govindan, Ramesh; Kohler, Eddie; Estrin, Deborah; Bian, Fang; Chintalapudi, Krishna; Gnawali, OM; Gummadi, Ramakrishna; Rangwala, Sumit; Stathopoulos, Thanos; "Tenet: An Architecture for Tiered Embedded Networks"; pp. 1-8.

Hill, Jason; Szewczyk, Robert; Woo, Alec; Hollar, Seth; Culler, David; Pister, Kristofer, "System Architecture Directions for Networked Sensors," ASPLOS 2000, Cambridge, Nov. 2000.

Intel.Com, "Exploratory Research Deep Networking" pp. 1-10 located at http://www.intel.com/research/exploratory/heterogenerous.htm, printed on Mar. 25, 2004.

Intel.Com, "New Computing Frontiers—The Wireless Vineyard" pp. 1-4 located at http://www.intel.com/labs/features/rs01031.htm, printed on Apr. 7, 2004.

Isis Nest: Institute for Software Integrated Systems; "Applications: Shooter Localizations", pp. 1-5, located at http://www.isis.vanderbilt.edu/projects.nest/applications.html, printed on Apr. 14, 2004.

Isis Nest: Institute for Software Integrated Systems; "Documents: NEST Documents", pp. 1-2, located at http://www.isis.vanderbilt.edu/projects.nest/documents.html, printed on Apr. 14, 2004.

Isis Nest: Institute for Software Integrated Systems; "Download: Nest Download", pp. 1-2, located at http://www.isis.vanderbilt.edu/projects.nest/download.html, printed on Apr. 14, 2004.

Isis Nest: Institute for Software Integrated Systems; "Middleware: Next Middleware Services", pp. 1 of 1, located at http://www.isis.vanderbilt.edu/projects.nest/middleware.html, printed on Apr. 14, 2004.

Isis Nest: Institute for Software Integrated Systems; "NEST Home: Network Embedded Systems Technology", pp. 1-2, located at http://www.isis.vanderbilt.edu/projects.nest/index.html, printed on Apr. 14, 2004.

Isis Nest: Institute for Software Integrated Systems; "People: The NEST Group", pp. 1 of 1, located at http://www.isis.vanderbilt.edu/projects.nest/people.html, printed on Apr. 14, 2004.

Isis Nest: Institute for Software Integrated Systems; "Tools: NEST Tools", pp. 1 of 1, located at http://www.isis.vanderbilt.edu/projects.nest/tools.html, printed on Apr. 14, 2004.

Johnson, R. Colin, "Companies test prototype wireless-sensor nets" EE Times, pp. 1-3, printable version of article located at http://www.eet.com/article/showArticle.jhtml?articleID=9900910, bearing a date of Jan. 29, 2003, printed on Jan. 27, 2004.

Kahn, Kevin C.; Culler, David E.; "Ad Hoc Sensor Networks a New Frontier for Computing Applications" bearing a date of Apr. 2002, printed on Apr. 9, 2004.

Kaminsky et al.; "Decentralized User Authentication in a Global File System"; ACM; bearing a date of Dec. 2003; pp. 60-73; vol. 37, Issue 5, Bolton Landing, New York.

Kling, Ralph, "Intel® Research Mote" pp. 1-13, Powerpoint Presentation, located at http://webs.cs.berkeley.edu/retreat-1-03/slides/imote-nest-q103-03-dist.pdf , Intel Corporation Research, Santa Clara, CA, printed on Apr. 13, 2004.

Krause, Andreas et al.; "Near-optimal Sensor Placements: Maximizing Information while Minimizing Communication Cost"; bearing dates of Apr. 19-21, 2006; pp. 2-10; (plus cover sheets).

Levis, Philip, "Viral Code Propagation in Wireless Sensor Networks," EECS Department, University of California at Berkeley, printed on Mar. 8, 2004.

Levis, Philip; Culler, David; "Maté: A Tiny Virtual Machine for Sensor Networks", pp. 1-11, printed on Apr. 12, 2004.

Levis, Philip; Madden, Sam; Gay, David; Polastre, Joseph; Szewczyk, Robert; Woo, Alec; Brewer, Eric; Culler, David; "The Emergence of Networking Abstractions and Techniques in TinyOS" pp. 1-14, printed on Apr. 13, 2004.

Levis, Philip; Patel, Neil; "Maté: Building Application-Specific Sensor Network Language Runtimes", bearing a date of Nov. 11, 2003, printed on Apr. 12, 2004.

Levis, Philip; Patel, Neil; Culler, David; Shenker, Scott; "Trickle: A Self-Regulating Algorithm for Code Propagation and Maintenance in Wireless Sensor Networks", printed on Apr. 13, 2004.

Li, Xin; Kim, Young Jin; Govindan, Ramesh; Hong, Wei; "Multi-dimensional Range Queries in Sensor Networks"; bearing dates of Nov. 5-7, 2003; pp. 63-75; ACM; located at http://www.cens.ucla.edu/sensys03/proceedings/p63-li.pdf.

Liscano, Ramiro, "Service Discovery in Sensor Networks: An Overview" Powerpoint Presentation; pp. 1-51; School of Information Technology and Engineering, University of Ottawa, Ottawa, Canada, bearing a date of 2003, printed on Mar. 8, 2004.

"Localization Distributed Embedded Systems" UCLA Computer Science 213: Localization Systems Powerpoint Presentation, pp. 1-61, bearing a course name of: CS 213/Estrin/Winter 2003, bearing a speaker name of: Lewis Girod, bearing a date of Feb. 4, 2003, printed on Mar. 15, 2004.

"Localization Standards", University of California Berkeley, located at http://localization.millennium.berkeley.edu/localization_standards.html, pp. 1 of 1, bearing a date of 2001, printed on Apr. 7, 2004.

"Localization.Millennium.Berkeley.Edu", University of California Berkeley, located at http://localization.millennium.berkeley.edu/introduction.html, pp. 1 of 1, bearing a date of 2001, printed on Apr. 7, 2004.

Lu, Jie et al.; "User Modeling for Full-Text Federated Search in Peer-to-Peer Networks"; Language Technologies Institute, Carnegie Mellon University; bearing dates of Aug. 6-11, 2006; pp. 332-339; (plus cover sheet).

Lu, Jie; Callan, Jamie; "Content-Based Retrieval in Hybrid Peer-To-Peer Networks"; Information Retrieval Session 4: General Retrieval Issues; 2003; pp. 199-206; ACM Press.

Lu, Jie; Callan, Jamie; "Content-Based Retrieval in Hybrid Peer-To-Peer Networks"; CIKM'03; bearing dates of Nov. 3-8, 2003; ACM.

Madden, Samuel, "Acquisitional Query Processing in TinyDB" Powerpoint Presentation, pp. 1-51; Nest Winter Retreat 2003, printed on Mar. 8, 2004.

U.S. Appl. No. 11/999,094, Jung et al.
U.S. Appl. No. 10/909,200, Jung et al.
U.S. Appl. No. 10/903,692, Jung et al.
U.S. Appl. No. 10/903,652, Jung et al.
U.S. Appl. No. 10/900,163, Jung et al.
U.S. Appl. No. 10/900,147, Jung et al.
U.S. Appl. No. 10/882,119, Jung et al.
U.S. Appl. No. 10/877,109, Jung et al.
U.S. Appl. No. 10/877,099, Jung et al.
U.S. Appl. No. 10/850,914, Jung et al.
U.S. Appl. No. 10/844,614, Jung et al.
U.S. Appl. No. 10/844,613, Jung et al.
U.S. Appl. No. 10/844,612, Jung et al.
U.S. Appl. No. 10/844,564, Jung et al.
U.S. Appl. No. 10/843,987, Jung et al.
U.S. Appl. No. 10/816,375, Jung et al.
U.S. Appl. No. 10/816,364, Jung et al.
U.S. Appl. No. 10/816,358, Jung et al.
U.S. Appl. No. 10/816,102, Jung et al.

U.S. Appl. No. 10/816,082, Jung et al.
U.S. Appl. No. 11/728,719, Tegreene, Clarence T.
U.S. Appl. No. 11/731,734, Tegreene, Clarence T.
U.S. Appl. No. 11/986,993, Tegreene, Clarence T.
Madden, Samuel, "Challenges in Sensor Network Query Processing" Powerpoint Presentation at the Jan. 15, 2002 NEST Retreat, printed on Mar. 8, 2004.
Madden, Samuel; Franklin, Michael J.; Hellerstein, Joseph; M., and Hong, Wei, "The Design of an Acquisitional Query Processor for Sensor Networks," pp. 1-14, SIGMOD, bearing a date of Jun. 2003.
Madden, Samuel; Szewczyk, R.; Franklin, Michael; and Culler, David "Supporting Aggregate Queries Over Ad-Hoc Wireless Sensor Networks," pp. 1-10, printed on Mar. 8, 2004.
Madden, Samuel; Szewczyk, R.; Franklin, Michael; Culler, David "Supporting Aggregate Queries Over Ad-Hoc Wireless Sensor Networks" Powerpoint Presentation, pp. 1-47, 4th IEEE Workshop on Mobile Computing, bearing a date of Jun. 21, 2002.
Madden et al.; "TAG: a Tiny Aggregation Service for Ad-Hoc Sensor Networks"; bearing a date of 2002; pp. 1-14; ; located at: http://www.cs.berkeley.edu/~franklin/Papers/madden_tag.pdf.
Maróti, Miklós; Völgyesi, Péter; Simon, Gyula; Karsai, Gábor; Lédeczi, Akos; "Distributed Middleware Services Composition and Synthesis Technology"; pp. 1-8, IEEE, bearing a date of 2002, printed on Apr. 14, 2004.
Nachman, Lama et al.; "The Intel ® Mote Platform: A Bluetooth*-Based Sensor Network for Industrial Monitoring"; Corporate Technology Group, Intel Corporation; bearing a date of 2005; pp. 1-6; (plus cover sheet).
Patnode, et al.; "WISENET," Spring 2003, Senior Design Project, pp. 1-26; http://cegt201.bradley.edu/projects/pro2003/wisenet/downloads/Wisenet_FINAL_REPORT.pdf.
Patnode, et al.; "WISENET—TinyOS Based Wireless Network of Sensors", IEEE, bearing a date of Nov. 6, 2003; pp. 1-6; http://ieeexplore.ieee.org/.
PCT International Search Report; International App. No. PCT/US05/11202; dated Sep. 27, 2006.
PCT International Search Report; International App. No. PCT/US05/10054; pp. 1-3; dated Dec. 1, 2006.
PCT International Search Report; International App. No. PCT/US05/11203; pp. 1-2; dated Feb. 9, 2007.
PCT International Search Report; International App. No. PCT/US05/10843; pp. 1-3; dated Jul. 3, 2007.
PCT International Search Report; International App No. PCT/US05/09640; pp. 1-2; dated Jul. 9, 2007.
PCT International Search Report; International App. No. PCT/US05/09479; pp. 1-3; dated Jul. 17, 2007.
PCT International Search Report; International App No. PCT/US05/10053; pp. 1-3; dated Aug. 10, 2007.
PCT International Search Report; International App. No. PCT/US05/09641; pp. 1-5; dated Sep. 13, 2007.
PCT International Search Report; International App. No. PCT/US05/09703; pp. 1-4; dated Sep. 28, 2007.
PCT International Search Report; International App. No. PCT/US05/10254; pp. 1-5; dated Oct. 17, 2007.
PCT International Search Report; International App. No. PCT/US05/10250; pp. 1-5; dated Oct. 18, 2007.
PCT International Search Report; International App. No. PCT/US05/10253; pp. 1-4; dated Oct. 23, 2007.
PCT International Search Report; International App. No. PCT/US05/10249; pp. 1-4; dated Oct. 24, 2007.
PCT International Search Report; International App. No. PCT/US05/10251; pp. 1-5; dated Oct. 25, 2007.
PCT International Search Report; International App. No. PCT/US05/10059; pp. 1-5; dated Oct. 26, 2007.
PCT International Search Report; International App. No. PCT/US05/10842, pp. 1-3; dated Nov. 7, 2007.
PCT International Search Report; International App. No. PCT/US05/11207; pp. 1-4; dated Nov. 13, 2007.
PCT International Search Report; International App. No. PCT/US05/11225; pp. 1-3; dated Nov. 23, 2007.
PCT International Search Report; International App. No. PCT/US05/10954; pp. 1-4; dated Feb. 26, 2008.
PCT International Search Report; International App. No. PCT/US05/10953; pp. 1-3; dated Jun. 17, 2008.
PCT International Search Report; International App. No. PCT/US05/10955; pp. 1-2; dated Jun. 23, 2008.
Pescovitz, David, "Robugs: Smart Dust Has Legs" pp. 1-2, located at http://www.coe.berkeley.edu/labnotes/0903/ pister_print.html, bearing a date of Sep. 2003, printed on Apr. 9, 2004.
Raghunathan, Vijay; Schurgers, Curt; Park, Sung; Srivastava, Mani B.; "Energy Aware Wireless Sensor Networks" pp. 1-17; Department of Electrical Engineering, University of California, Los Angeles; printed on Mar. 15, 2004.
Razeeb, Kafil M. et al.; "A Hybrid Network of Autonomous Sensor Nodes"; NMRC, University College Cork; bearing dates of Nov. 8-10, 2004; pp. 69-70; (plus cover sheet).
Ryer, Alex; Light Measurement Handbook, http://www.intl-light.com/handbook; pp. 1-64, copyright 1997, printed on Mar. 8, 2004.
Savvides, Andreas; "Hardware", pp. 1-3, located at http://nesl.ee.ucle.edu/projects/ahlos/hardware.htm, Networks and Embedded Systems Lab, University of California, Los Angeles; bearing a date of Jan. 18, 2003, printed on Feb. 23, 2004.
Savvides, Andreas; "Localization Forum", pp. 1 of 1, located at http://nesl.ee.ucla.edu/projects/ahlos/localization_forum.htm, Networks and Embedded Systems Lab, University of California, Los Angeles; bearing a date of Dec. 24, 2003, printed on Feb. 23, 2004.
Searchmobilecomputing.Com, "Ad-Hoc Network" pp. 1-3 located at http://searchmobilecomputing.techtarget.com/sDefinition/0,,sid40_gci213462,00.html, bearing a date of Apr. 11, 2003, printed on Mar. 8, 2004.
Searchnetworking.com Definitions, "Jini" pp. 1-3 located at http://searchnetworking.techtarget.com/sDefinition/0,,sid7_gci212422,00.html, bearing a date of Apr. 10, 2003, printed on Mar. 8, 2004.
Sharifzadeh, Mehdi et al.; "Supporting Spatial Aggregation in Sensor Network Databases*"; Computer Science Department, University of Southern California; bearing dates of Nov. 12-13, 2004; pp. 166-175; (plus cover sheet).
Spyropoulos, Akis; Raghavendra, C.S., "Energy Efficient Communications in Ad Hoc Networks Using Directional Antennas," Dept. of Electrical Engineering-Systems, University of Southern California, bearing a date of 2002, printed on Feb. 23, 2004.
Stathopoulos, Thanos; Girod, Lewis; Heidemann, John; Estrin, Deborah; "More Herding for Tiered Wireless Sensor Networks"; Center for Embedded Networked Sensing; pp. 1-14; UCLA, Department of Computer Science / USC, Information Sciences Institute.
"The Ad-Hoc Localization System (AHLoS)" Networks and Embedded Systems Lab, University of California, Los Angeles; located at http://nesl.ee.ucla.edu/projects/ahlos/Default.htm, pp. 1-4, printed on Feb. 23, 2004.
"Tiny DB A Declarative Database for Sensor Networks" pp. 1-2, located at http://telegraph.cs.berkeley.edu/tinydb/ printed on Apr. 9, 2004.
Tiny Sec: Link Layer Security for Tiny Devices, "Calamari: A localization system for sensor networks", pp. 1-6, located at http://www.cs.berkeley.edu/~kamin/calamari/ printed on Apr. 12, 2004.
Viswanath, Kumar, "Adaptive, Integrated Multicast Routing for Group Communications in Ad-Hoc Networks" Powerpoint Presentation, pp. 1-12; Computer Engineering Department, University of California, Santa Cruz, printed on Mar. 8, 2004.
Woo, Alec; Culler, David E.; "A Transmission Control Scheme for Media Access in Sensor Networks"; bearing a date of Jul. 2001; pp. 1-15; located at: http://www.cs.berkeley.edu/~awoo/awoo_mobicom.pdf.
Woo, Alec; Tong, Terence; and Culler, David, "Taming the Underlying Challenges of Reliable Multihop Routing in Sensor Networks,"pp. 1-14, SenSys '03, Nov. 5-7, 2003, Los Angeles, California, USA.
U.S. Appl. No. 12/454,634, Jung et al.
U.S. Appl. No. 12/454,171, Jung et al.

Madden et al.; "Tiny DB: In-Network Query Processing in TinyOS"; Version 0.4; pp. 1-46; Sep. 2003; printed on Apr. 27, 2009; located at: http://telegraph.cs.berkeley.edu/tinydb/tinydb.pdf.

Warneke, Brett et al.; "Ultra-Low Power Communication Logic Circuits for Distributed Sensor Networks"; EECS 241; bearing a date of Spring 1998; pp. 1-7; UC Berkeley.

U.S. Appl. No. 12/584,058, Jung et al.

Fornaro et al.; "Tiny Sensor-Based Computers Could Help Track Wildlife"; News Release; bearing a date of Nov. 6, 2003; pp. 1-2; located at http://www.ncsu.edu/news/press_releases/03_11/321.pdf.

* cited by examiner

FIG. 3

| | Occurrence | Characteristic | Representative Feature |
|---|---|---|---|
| 1 | Car crash | a. Breaking glass<br>b. Impact noise<br>c. Tire screech<br>d. Emergency vehicles present | a. high and broadly distributed sound frequencies<br>b. middle frequency sounds<br>c. middle frequency sounds<br>d. "Do-dah, do-dah" siren sound pattern |
| 2 | Siren Sound | | "Do-dah, do-dah" siren sound pattern |
| 3 | Fire | a. Emergency vehicles present<br>b. fire alarm sound<br>c. heat<br>d. flames | a. "Do-dah, do-dah" siren sound pattern<br>b. various sound patterns<br>c. high temperatures<br>d. optical colors |
| 4 | Armored Convoy | a. heavy equipment rumble<br>b. ground shaking<br>c. olive-drab colored vehicles<br>d. diesel exhaust | a. low frequency sound<br>b. low frequency vibration<br>c. absence of yellow colors<br>d. airborne carbon particles |
| 5 | Assault | a. yelling and loud voices<br>b. breaking glass<br>c. gun shot | a. sound above a certain db for several seconds<br>b. high and broadly distributed sound frequencies<br>c. sounds greater than a certain db for less than a second |
| 6 | Gun shot | | Sounds greater than a certain db for less than a second |

To Fig. 5B

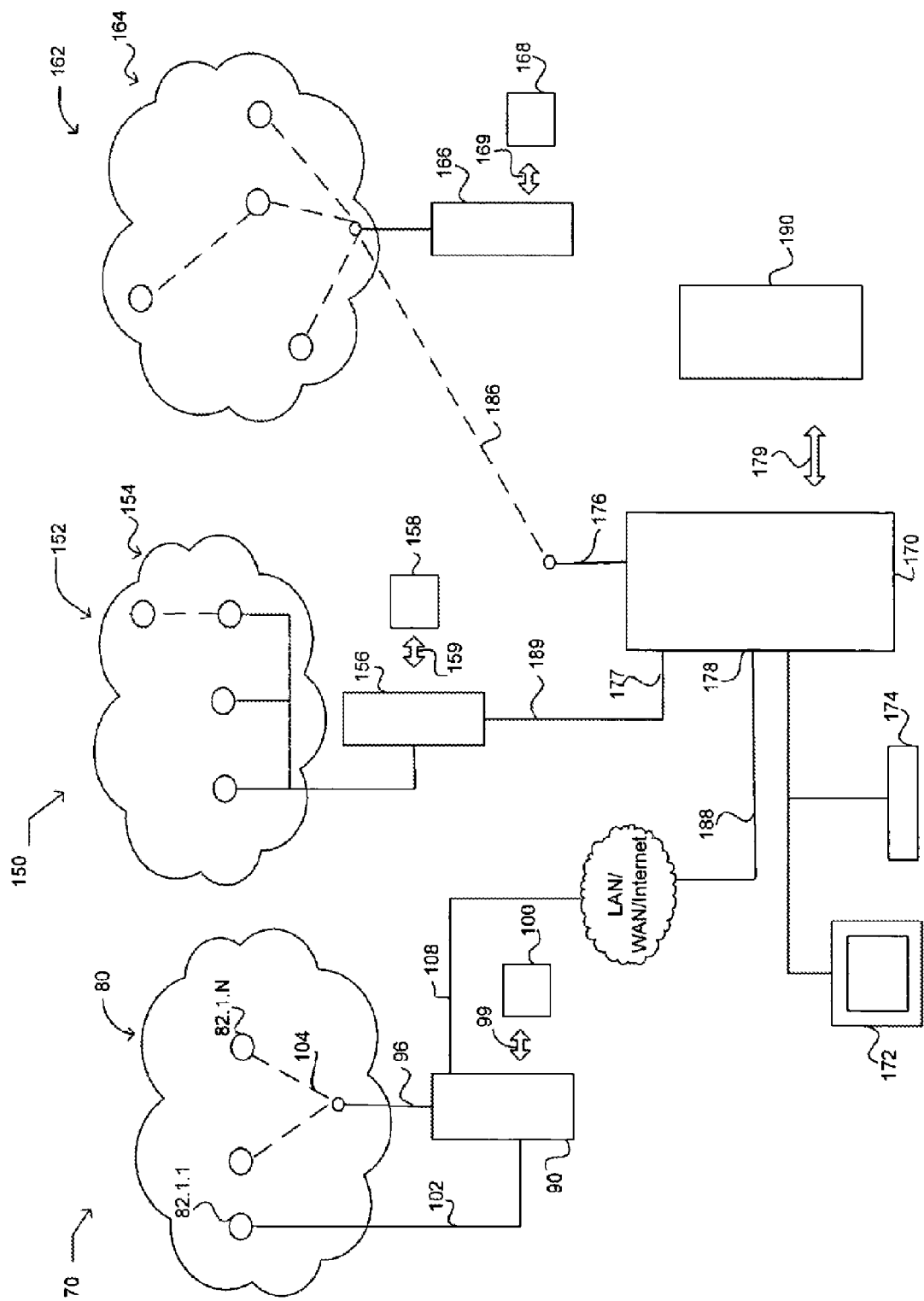

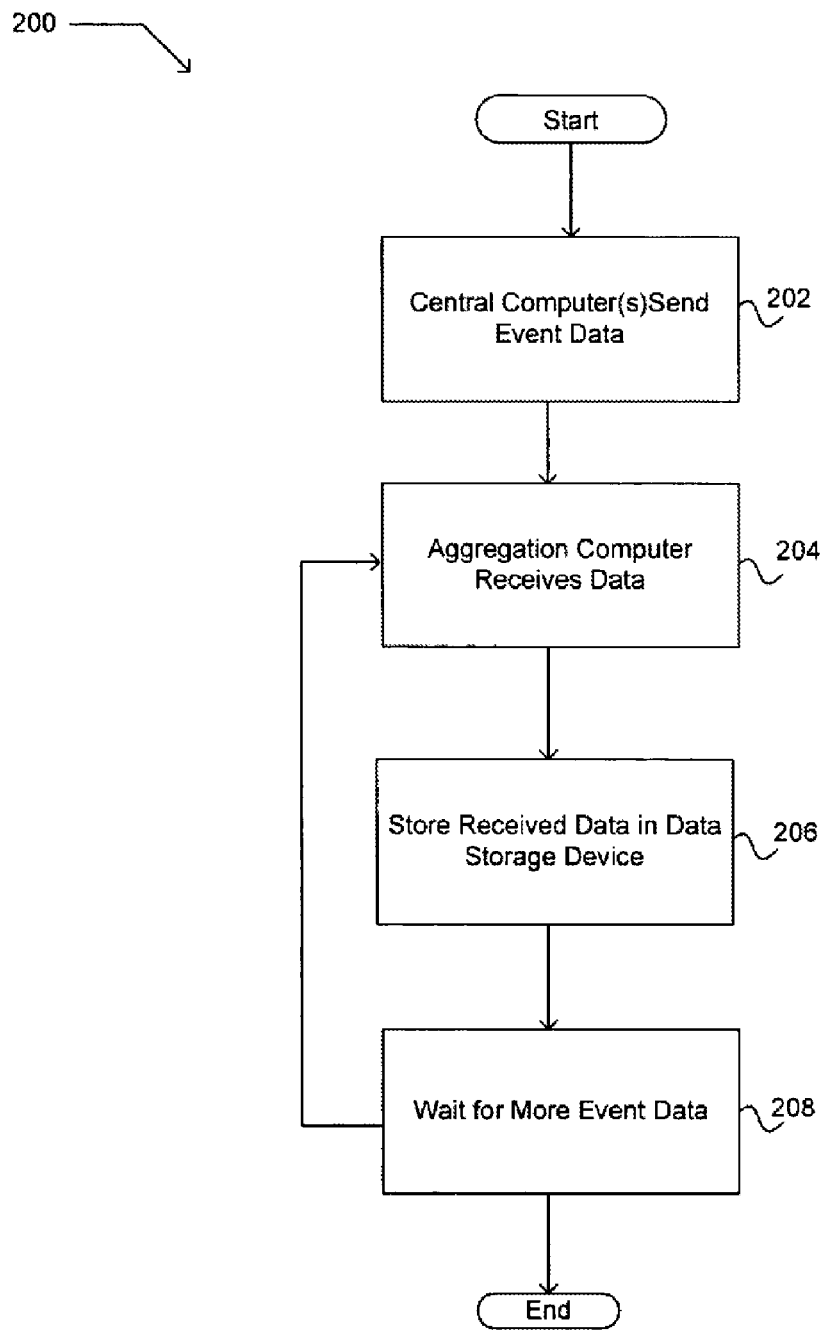

AGGREGATION AND RETRIEVAL OF MOTE NETWORK DATA

CROSS REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, and incorporates by reference in its entirety all subject matter of the following listed application(s); the present application also claims the earliest available effective filing date(s) from, and also incorporates by reference in its entirety all subject matter of any and all parent, grandparent, great-grandparent, etc. applications of the following listed application(s) (in the event of any inconsistencies between the instant application and an application incorporated by reference, the instant application controls); Applicants expressly note, however, that nothing in the specification or claims of the present application is intended to "backflow" or effect in any way the following listed related applications, particularly as such related applications distinguish mote-related technologies from non-mote or generalized sensor network technologies:

RELATED APPLICATIONS

For purposes of the United States Patent and Trademark Office (USPTO) extra-statutory requirements (described more fully below), the present application is:

1. A continuation application of U.S. patent application Ser. No. 10/903,692 entitled AGGREGATION AND RETRIEVAL OF NETWORK SENSOR DATA, naming Edward K. Y. Jung and Clarence T. Tegreene as inventors, filed 30 Jul., 2004, now issued as U.S. Pat. No. 7,457,834.

2. A continuation-in-part application of U.S. patent application Ser. No. 10/909,200 entitled DISCOVERY OF OCCURRENCE-DATA, naming Edward K. Y. Jung and Clarence T. Tegreene as inventors, filed 30 Jul. 2004.

3. A continuation-in-part application of U.S. patent application Ser. No. 10/903,652 entitled DATA STORAGE FOR DISTRIBUTED SENSOR NETWORKS, naming Edward K. Y. Jung and Clarence T. Tegreene as inventors, filed 30 Jul. 2004, now issued as U.S. Pat. No. 7,536,388.

The United States Patent and Trademark Office (USPTO) has published a notice to the effect that the USPTO's computer programs require that patent applicants reference both a serial number and indicate whether an application is a continuation or continuation in part. Stephen G. Kunin, Benefit of Prior-Filed Application, USPTO Electronic Official Gazette, Mar. 18, 2003. The present applicant entity has provided a specific reference to the application(s) from which priority is being claimed as recited by statute. Applicant entity understands that the statute is unambiguous in its specific reference language and does not require either a serial number or any characterization such as "continuation" or "continuation-in-part." Notwithstanding the foregoing, applicant entity understands that the USPTO's computer programs have certain data entry requirements, and hence applicant entity is designating the present application as a continuation in part of its parent applications, but expressly points out that such designations are not to be construed in any way as any type of commentary and/or admission as to whether or not the present application contains any new matter in addition to the matter of its parent application(s).

SUMMARY

An embodiment provides a data system. The system includes a computing device operable to communicate with a local data storage device and with a remote data storage operation to store a plurality of instances of mote data. Each instance of mote data respectively correlating to an occurrence, and instructions, which when implemented in a computing device, cause the computing device to perform steps. The steps include receive the plurality of instance of mote data from the remote digital storage device, and receive an input selection corresponding to a target-occurrence having at least one representative feature. Also automatically search the stored plurality of instances of mote data for mote data correlating to the target-occurrence. If mote data correlating to the target-occurrence is found, provide the correlating mote data. The search for mote data correlating to the target-occurrence may include correlating to at least one representative feature of the occurrence. An occurrence may include a real world event, a real world incident, a change in a data sequence, and a change in a time domain. The plurality of instance of mote data may include a first instance of mote data correlating to a respective first occurrence and a second instance of mote data correlating to a respective second occurrence. The first and second occurrences may have happened at a substantially a same time, and/or at a substantially a same location. The first and second occurrences may include an at least substantially similar representative feature. The mote data of the first occurrence may relate a first matter and the mote data of the second occurrence may relate to a second matter. The first and second matters may be substantially similar. Each instance of mote data may include a respective sequence, and the sequence may include a chronological sequence.

Another embodiment provides an occurrence-data archival system. The system includes a computing device operable to communicate with an archival data storage and a plurality of remote data storages, and instructions, which when implements in a computing device, cause the computing device to perform steps. The steps include receive a plurality of instances of correlated mote data from a plurality of remote data storages, each instance of mote data respectively correlating to an occurrence, and store the received plurality of instance of correlated mote data in the archival data storage. The system may further include a local data storage device operable as the archival data storage. The correlating of an occurrence may include correlating to at least one representative feature of the occurrence. The at least one representative feature may include a sequence. An occurrence may include a real world event, and a real world incident. The plurality of instance of mote data may include a first instance of mote data correlating to a respective first occurrence. The mote data of the first occurrence may relate a first matter and the mote data of the second occurrence may relate to a second matter, and the first and second matters may be at least substantially similar. Each instance of mote data may include a respective sequence, and the sequence may include a chronological sequence. Each instance of mote data may have been acquired by at least one mote of a plurality of distributed motes. Each mote may be part of a network of motes. The system may further include an information security measure operable to protect the stored plurality of instance of mote data. The information security measure may provide at least one selected from a group consisting of information confidentiality, information integrity, and access control. The instructions may further include delete a portion of the stored data from the at least one remote data storage.

At least one instance of the received mote data may include an associated tentative occurrence-identifier. The tentative occurrence-identifier may be associated by a method. The method includes receiving an input selection corresponding to a target-occurrence having at least one representative feature, and automatically selecting a pattern recognition criteria corresponding to at least one representative feature of the target-occurrence. Also, searching mote data for data correlating to the target-occurrence using the selected pattern recognition criteria, and, if mote data correlating to the target-occurrence representative feature is found, associating the tentative occurrence-identifier with the correlating mote data.

A yet further embodiment provides a method implemented in a computing device. The method includes receiving a plurality of instances of correlated mote data from a plurality of remote data storages, each instance of mote data respectively correlating to an occurrence. Also, storing the received plurality of instances of correlated mote data in a local data storage device, and protecting the received plurality of instances of correlated mote data with an information security measure. The receiving step further may include receiving the plurality of instances of mote data in response to a data push. The method may further include requesting the plurality of instances of mote data from the remote data storage. The information security measure may protect by providing at least one selected from a group consisting of information confidentiality, information integrity, and access control.

An occurrence may include a real world event, a real world incident, a change in a data sequence, and a change in a time domain. The plurality of instances of mote data may include a first instance of mote data correlating to a respective first occurrence and a second instance of mote data correlating to a respective second occurrence. The first and second occurrences may have happened at substantially a same time, and/or at substantially a same location. The first and second occurrences may include an at least substantially similar representative feature. The mote data of the first occurrence may relate a first matter and the mote data of the second occurrence may relate to a second matter. The first and second matters may be substantially similar. Each instance of mote data may include a respective sequence, and the sequence may include a chronological sequence. An occurrence may include a sequence, a representative feature, and an associated tentative occurrence-identifier. The method may further include deleting at least one of the plurality of instances of mote data from its respective remote data storage.

An embodiment includes an occurrence-data retrieval system. The system includes a computing device operable to communicate with a data storage which is operable to store a plurality of instances of mote data acquired from at least one mote of a mote network, each instance of mote data respectively correlating to an occurrence, and instructions, which when implemented in a computing device, cause the computing device to perform steps. The steps include receive from an input-selector an input selection corresponding to a target-occurrence, and automatically search the plurality of instances of mote data stored in the data storage for mote data correlating to the target-occurrence. If mote data correlating to the target-occurrence is found, provide the correlating mote data. Each occurrence may include a representative feature. The data storage may be remote or local to the computing device. The computing device may communicate with a remote data storage through an intermediate computing device. The provide instruction further may include provide the correlating mote data to the input-selector, and/or a third party. The instructions further include receive the plurality of instances of mote data from at least one remote data storage, and store the received plurality of instances of correlated mote data in a local data storage.

Another embodiment provides an occurrence-data retrieval system. The system includes a local digital data storage device operable to store a plurality of instances of mote data, each instance of mote data correlating to at least one representative feature of an occurrence. The system further includes a central computing device operable to communicate with the local digital data storage device, and instructions, which when implemented in a computing device, cause the computing device to perform steps. The steps include receive from an input-selector an input selection corresponding to a target-occurrence having at least one representative feature, and automatically select a pattern recognition criteria corresponding to at least one representative feature of the target-occurrence. In response to the input selection corresponding to the target-occurrence, automatically search the plurality of instances of stored mote data for data correlating to the target-occurrence using the selected pattern recognition criteria. If mote data correlating to the target-occurrence representative feature is found, provide the correlating mote data. An input-selector may include a machine, and a user. The pattern recognition criteria may be automatically selected by the instructions in response to the target-occurrence. The input selection further may include a selection of a representative feature of the target-occurrence. The pattern recognition criteria may be automatically selected by the instructions in response to the input-selected representative feature. The automatic search instruction may include using the pattern recognition criteria selected in response to the inputted representative feature. The instructions may further include protect the plurality of instances of mote data stored in the at least one local digital data storage device from unauthorized access.

A yet further embodiment provides an occurrence-data retrieval system. The system includes a computing device operable to communicate with a data storage device having a plurality of instances of mote data stored thereon, each instance of mote data correlating to an occurrence, and an information security measure protecting the mote data stored in the at least one selected data storage device from unauthorized access. The system also includes instructions, which when implemented in a computing device, cause the computing device to perform steps. The steps include receive from an input-selector an input selection corresponding to a target-occurrence having at least one representative feature, a recipient selection, and a tendered access authorization. In response to the tendered access authorization, determine if at least one of the input-selector and recipient have an access right, and automatically select a pattern recognition criteria corresponding to at least one representative feature of the target-occurrence. In response to the input selection corresponding to the target-occurrence, automatically search the plurality of instances of mote data stored in the data storage device for data correlating to the target-occurrence using the selected pattern recognition criteria. If mote data correlating to the target-occurrence representative feature is found, and if at least one of the source and recipient have an access right, provide the correlating mote data to the recipient. An input-selector may include a machine and a user. The input-selector and the recipient may be a same party. A recipient may be a user, and a machine. The data storage device may include a device selected from a group consisting of a local data storage device and a remote data storage device.

An embodiment provides an occurrence-data retrieval system. The system includes a data storage device having a stored plurality of instances of mote data, each instance of mote data correlating to at least one representative feature of an occurrence and including an associated tentative occurrence-identifier. Also, a computing device operable to communicate with at the least one data storage device, and an information security measure that controls access to the stored plurality of instances of mote data. Instructions, which when implemented in a computing device, cause the computing device to perform steps. The steps include receive from an input-selector an input selection corresponding to a target tentative occurrence-identifier, and a tender of access authorization. In response to the input selection corresponding to the target tentative occurrence-identifier, automatically search the plurality of instances of mote data for data correlating to the target tentative occurrence-identifier. If mote data correlating to the target tentative occurrence-identifier is found, and if at least one of the source and recipient possess an access right, provide the correlating mote data. The data storage device may include a device selected from a group consisting of a local data storage device and a remote data storage device.

A further embodiment provides a method. The method includes receiving from an input-selector an input selection corresponding to a target-occurrence having at least one representative feature. The method also includes automatically searching a plurality of instances of stored mote data for mote data correlating to the target-occurrence, each instance of mote data correlating to an occurrence having at least one representative feature. If mote data correlating to the target-occurrence is found, providing the correlating mote data. The plurality of instances of mote data may be stored in a data storage device. The data storage device may be selected from a group consisting of a data storage device local to the computing device and a data storage device remote to the computing device. The providing further may include indicating a rank for at least two instances of the correlating mote data in a hierarchy of the found correlating mote data.

A yet further embodiment provides a method implemented in a computing device. The method includes receiving an input selection from an input-selector corresponding to a target-occurrence having at least one representative feature, a recipient selection, and a tendered access authorization. The method further includes automatically selecting a pattern recognition criteria corresponding to at least one representative feature of the target-occurrence. In response to the input selection corresponding to the target-occurrence, automatically searching a plurality of instances of stored correlated mote data for data correlating to the target-occurrence using the selected pattern recognition criteria, each instance of mote data correlating to at least one representative feature of an occurrence. In response to the tendered access authorization, determine if at least one of the input-selector and the recipient posses an access right. If mote data correlating to the target-occurrence representative feature is found, and if at least one of the input-selector and the recipient have an access right, providing the correlating mote data. The instances of stored correlated mote data may be stored in a data storage device local to the computing device.

An embodiment provides a method implemented in a computing device. The method includes receiving an input selection from an input-selector corresponding to a tentative target-occurrence identifier, the target-occurrence having at least one representative feature, a recipient selection, and a tendered access authorization. In response to the input selection corresponding to the tentative target-occurrence identifier, automatically searching a plurality of instances of stored correlated mote data for data correlating to the tentative target-occurrence identifier. If mote data correlating to the tentative target-occurrence identifier is found, providing the correlating mote data. The instances of stored correlated mote data may be stored in a data storage device local to the computing device.

Another embodiment provides an occurrence-data archival system. The system includes a computing device operable to communicate with an archival data storage and a plurality of remote data storage devices, and instructions, which when implemented in a computing device, cause the computing device to perform steps. A step includes receive a plurality of mote data sets from remote data storage devices, each mote data set representing a respective feature sensed by its respective remote storage device, the respective feature having a correlation to a reference. Another step includes store the received plurality of mote data sets in the archival data storage. The reference of a first data set may be a first occurrence. The reference of a second data set may be a second occurrence. The first occurrence and the second occurrence may be at least substantially the same.

A yet further embodiment provides a method implemented in a computing device. The method includes receiving a plurality of mote data sets from remote data storage devices, each mote data set representing a respective feature sensed by its respective remote storage device, the respective feature having a correlation to a reference. The method further includes storing the received plurality of mote data sets in a local data storage device. The reference of a first data set may be a first occurrence, which may be a temporal reference related to the first occurrence. The reference of a second data set may be a second occurrence, which may be a temporal reference related to the second occurrence. The first occurrence and the second occurrence may be at least substantially the same. The method may further include protecting the received plurality of instances of correlated mote data with an information security measure.

An embodiment provides a data retrieval system. The system includes a local data storage device operable to store mote data sets from remote data storage devices, each mote data set representing a respective feature sensed by its respective remote storage device, the respective feature having a correlation to a reference. The system also includes a computing device operable to communicate with a local data storage device, and instructions, which when implemented in a computing device, cause the computing device to perform steps. The steps include receive from an input-selector an input selection corresponding to a target-reference, and automatically search the instances of mote data stored in the data storage device for mote data correlating to the target-reference. If mote data correlating to the target-reference is found, provide the correlating mote data.

A further embodiment provides a method. The method includes moving a portable central computing device to location such that the portable central computing device communicates with at least one mote of a network of distributed motes. Each mote is operable to sense and store a plurality of data sets each respectively representing a respective feature, each respective feature having a correlation to an occurrence. The method also includes causing the central computing device to acquire at least one mote data set. The method may include selecting through the central computing device a mote data set to be transmitted from the at least one mote to the central computing device. The method may include confirming that the at least one selected mote data set is acquired by the central computing device. Each mote may include operability to filter the plurality of data sets for a feature correlating to a target-occurrence. Causing the central computing device to acquire at least one data set may include causing the central computing device to acquire at least one data set having a feature correlating to the target occurrence.

These and various other features as well as advantages of the present invention will be apparent from a reading of the following detailed description and a review of the associated drawings.

BRIEF DESCRIPTION OF THE DRAWINGS

Aspects of the invention, together with features and advantages thereof, may be understood by making reference to the following description taken in conjunction with the accompanying drawings, in the several figures of which like referenced numerals identify like elements, and wherein:

FIG. 3 is a table illustrating several classes of occurrences, a relationship between an individual occurrence and at least one characteristic or attribute of the individual occurrences, and representative features of the individual characteristics;

FIG. 6 illustrates a distributed sensor node occurrence-data archival and retrieval system;

FIG. 7 is a flow diagram illustrating an exemplary process that aggregates and stores a plurality of instances of correlated sensor data in an occurrence-data archive;

DETAILED DESCRIPTION

In the following detailed description of exemplary embodiments, reference is made to the accompanying drawings, which form a part hereof. The detailed description and the drawings illustrate specific exemplary embodiments by which the invention may be practiced. Other embodiments may be utilized, and other changes may be made, without departing from the spirit or scope of the present invention.

Throughout the specification and claims, the following terms take the meanings explicitly associated herein unless the context dictates otherwise. The meaning of "a", "an", and "the" include plural references. The meaning of "in" includes "in" and "on."

Figure 12:
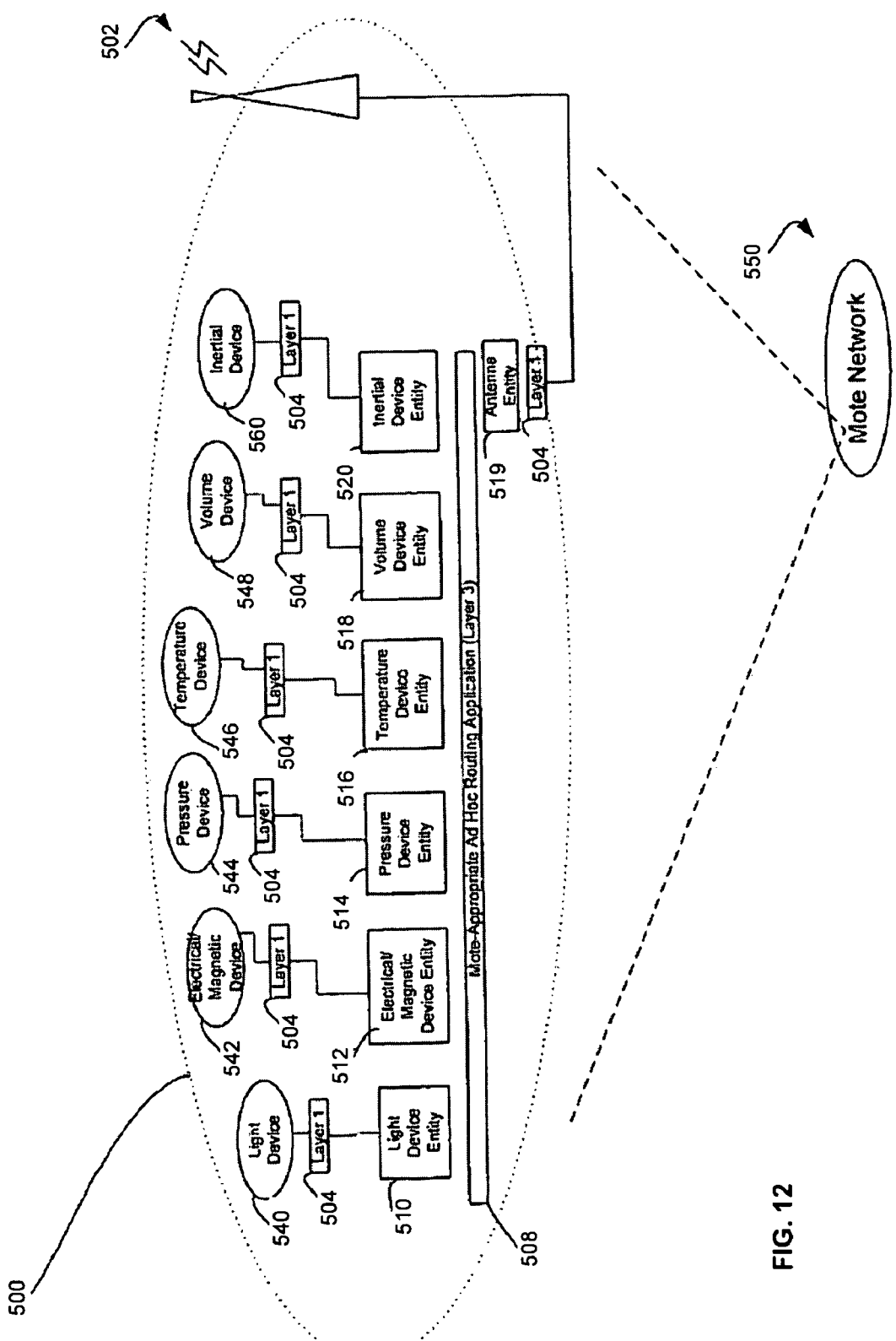
FIG. 12 shows an example of a mote of a mote network that may serve as a context of one or more processes and/or devices described herein.

With reference now to FIG. 12, shown is an example of mote 500 of mote-appropriate network 550 that may serve as a context for introducing one or more processes and/or devices described herein. A mote is typically composed of sensors, actuators, computational entities, and/or communications entities formulated, in most cases at least in part, from a substrate. As used herein, the term "mote" typically means a semi-autonomous computing, communication, and/or sensing device as described in the mote literature (e.g., Intel Corporation's mote literature), as well as equivalents recognized by those having skill in the art (e.g., Intel Corporation's smart dust projects). Mote 500 depicts a specific example of a more general mote. Mote 500 is illustrated as having antenna 502, physical layer 504, antenna entity 519, network layer 508 (shown for sake of example as a mote-appropriate ad hoc routing application), light device entity 510, electrical/magnetic device entity 512, pressure device entity 514, temperature device entity 516, volume device entity 518, and inertial device entity 520. Light device entity 510, electrical/magnetic device entity 512, pressure device entity 514, temperature device entity 516, volume device entity 518, antenna entity 519, and inertial device entity 520 are depicted to respectively couple through physical layers 504 with light device 540, electrical/magnetic device 542, pressure device 544, temperature device 556, volume device 558, antenna 502, and inertial device 560. Those skilled in the art will appreciate that the herein described entities and/or devices are illustrative, and that other entities and/or devices consistent with the teachings herein may be substituted and/or added.

Those skilled in the art will appreciate that herein the term "device," as used in the context of devices comprising or coupled to a mote, is intended to represent but is not limited to transmitting devices and/or receiving devices dependent on context. For instance, in some exemplary contexts light device 540 is implemented using one or more light transmitters (e.g., coherent light transmission devices or non-coherent light transmission devices) and/or one or more light receivers (e.g., coherent light reception devices or non-coherent light reception devices) and/or one or more supporting devices (e.g., optical filters, hardware, firmware, and/or software). In some exemplary implementations, electrical/magnetic device 542 is implemented using one or more electrical/magnetic transmitters (e.g., electrical/magnetic transmission devices) and/or one or more electrical/magnetic receivers (e.g., electrical/magnetic reception devices) and/or one or more supporting devices (e.g., electrical/magnetic filters, supporting hardware, firmware, and/or software). In some exemplary implementations, pressure device 544 is implemented using one or more pressure transmitters (e.g., pressure transmission devices) and/or one or more pressure receivers (e.g., pressure reception devices) and/or one or more supporting devices (e.g., supporting hardware, firmware, and/or software). In some exemplary implementations, temperature device 556 is implemented using one or more temperature transmitters (e.g., temperature transmission devices) and/or one or more temperature receivers (e.g., temperature reception devices) and/or one or more supporting devices (e.g., supporting hardware, firmware, and/or software). In some exemplary implementations, volume device 558 is implemented using one or more volume transmitters (e.g., gas/liquid transmission devices) and/or one or more volume receivers (e.g., gas/liquid reception devices) and/or one or more supporting devices (e.g., supporting hardware, firmware, and/or software). In some exemplary implementations, inertial device 560 is implemented using one or more inertial transmitters (e.g., inertial force transmission devices) and/or one or more inertial receivers (e.g., inertial force reception devices) and/or one or more supporting devices (e.g., supporting hardware, firmware, and/or software).

Those skilled in the art will recognize that although a quasi-stack architecture is utilized herein for clarity of presentation, other architectures may be substituted in light of the teachings herein. In addition, although not expressly shown, those having skill in the art will appreciate that entities and/or functions associated with concepts underlying Open System Interconnection (OSI) layer 2 (data link layers) and OSI layers 4-6 (transport-presentation layers) are present and active to allow/provide communications consistent with the teachings herein. Those having skill in the art will appreciate that these layers are not expressly shown/described herein for sake of clarity.

Figure 1:
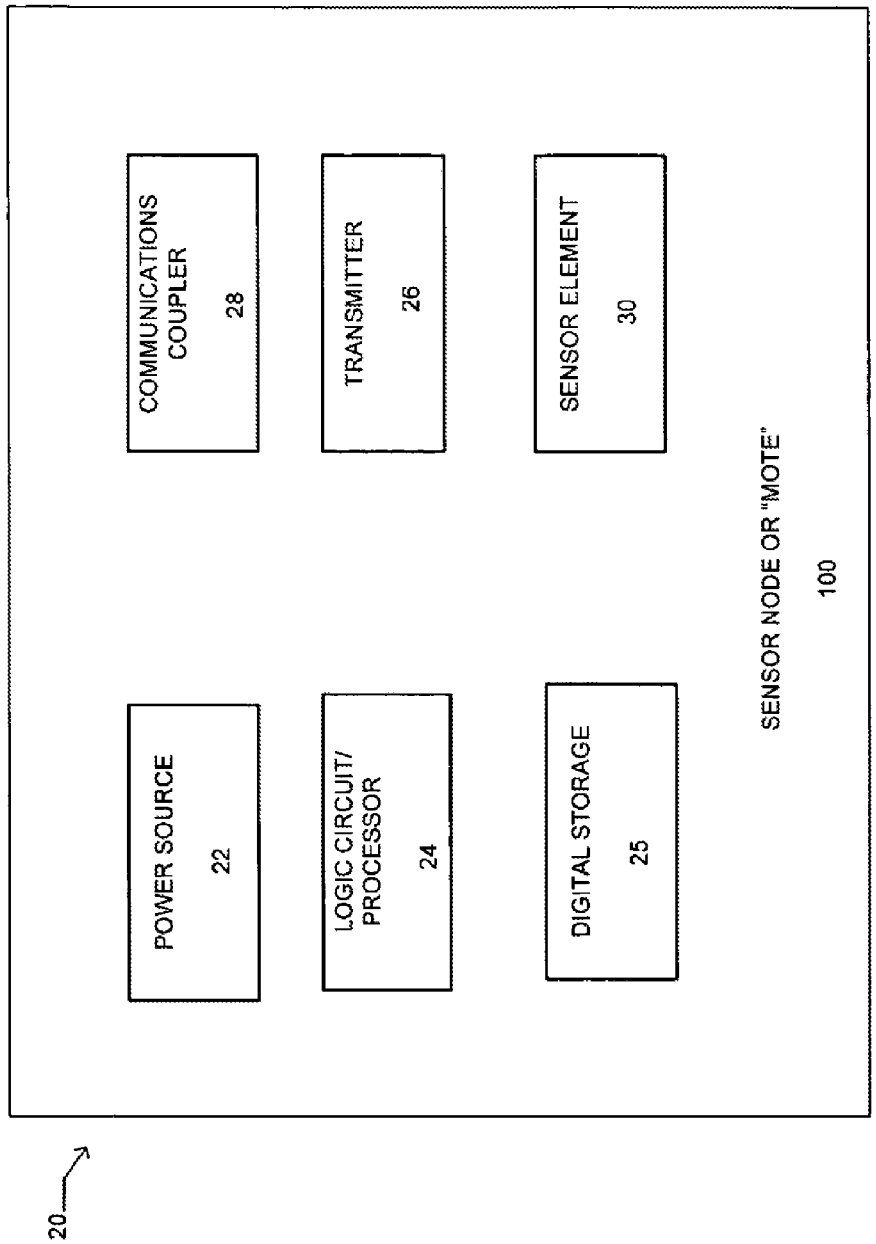
FIG. 1 illustrates a sensor node, or "mote;"

FIG. 1 illustrates a mote 20, many of which can be combined to form a mote network. As used herein, the term "mote" typically means a semi-autonomous computing, communication, and/or sensing device as described in the mote literature (e.g., Intel Corporation's mote literature), as well as equivalents recognized by those having skill in the art (e.g., Intel Corporation's smart dust projects). Mote 20 depicts a specific example of a more general mote.

The mote 20 may be of various sizes, and may be as small as a quarter coin, or smaller, as mote sizes are now in the millimeter range. The mote 20 includes a power source 22, a logic circuit/microprocessor 24, a storage device 25, a transmitter (or transceiver) 26, a communications coupler 28 coupled to the transmitter 26, and a mote element 30. Alternatively, the mote may be unpowered or passive, drawing its power from a reader or another source.

In the illustrated embodiment, the power source 22 provides power to the mote 20. For example, the power source 22 may include a battery, a solar-powered cell, and/or a continuous power supply furnished by an external power source, such as by connection to a power line. By way of example, the storage device 25 includes any computer readable media, such as volatile and/or nonvolatile media, removable and/or non-removable media, for storing computer data in permanent or semi-permanent form, and can be implemented with any data storage technology. Alternatively, the storage device 25 may store data in a form that can be sampled or otherwise converted into a form storable in a computer readable media.

The transmitter 26 transmits a data signal. In an optional embodiment, the transmitter 26 both receives and transmits data signals (transceiver). A "data signal" includes, for example and without limitation, a current signal, voltage signal, magnetic signal, or optical signal in a format capable of being stored, transferred, combined, compared, or otherwise manipulated. The transmitter 26 may include wireless, wired, infrared, optical, and/or other communications techniques, for communication with a central computing device or central station, and optionally other motes, using the communications coupler 28. The communications coupler 28 may include an antenna for wireless communication, a connection for wired connection, and/or an optical port for optical communication.

The mote 20 may include any type of data processing capacity, such a hardware logic circuit, for example an application specific integrated circuit (ASIC) and a programmable logic, or such as a computing device, for example, a microcomputer or microcontroller that include a programmable microprocessor. The embodiment of the mote 20 illustrated in FIG. 1 includes data-processing capacity provided by the microprocessor 24. The microprocessor 24 may include memory, processing, interface resources, controllers, and counters. The microprocessor 24 also generally includes one or more programs stored in memory to operate the mote 20. If an embodiment uses a hardware logic circuit, the logic circuit generally includes a logical structure that operates the mote 20.

The mote 20 includes one or more mote elements 30 that are capable of detecting a parameter of an environment in which the mote is located and outputting a data signal. The mote element 30 may detect at least one parameter from a group of optical, acoustic, pressure, temperature, thermal, acceleration, magnetic, biological, chemical, and motion parameters. The optical parameter may include at least one from a group consisting of infrared, visible, and ultraviolet light parameters. For example and without limitation, the mote element 30 may include a photo sensor to detect a level or change in level of light, a temperature sensor to detect temperature, an audio sensor to detect sound, and/or a motion sensor to detect movement. The mote element 30 may include a digital image capture device, such as for example and without limitation, a CCD or CMOS imager that captures data related to infrared, visible, and/or ultraviolet light images.

Typically, the mote 20 automatically acquires data related to a parameter of the mote environment, and transmits data to a central computing device. For example, the mote element 30 in a form of an acoustic sensor may acquire sound levels and frequencies, and transmit the data related to the levels and frequencies along with a time track using the transmitter 26 and the communication coupler 28. The acquisition may be on any basis, such as continuously, intermittently, sporadically, occasionally, and upon request. In an alternative embodiment, the time track may be provided elsewhere, such as a device that receives the sensor data.

By way of further example and without limitation, the mote element 30 in a form of an optical digital camera may periodically acquire visual images, such as for example, once each second, and to transmit the data related to visual images along with a time track. In another example, the mote element 30 in the form of a temperature sensor may detect temperature changes in two-degree temperature intervals, and to transmit each two-degree temperature change along with the time it occurred. Each of the above examples illustrates a sequence, ranging from continuous for acoustical detection to a per occurrence basis for two-degree temperature changes.

The mote element 30 may sense operational parameters of the mote 20 itself, such as its battery/power level, or its radio signal strength. Mote data, including a data related to a sensed parameter, is transmitted from the mote 20 in any signal form via the transmitter 26 and the communications coupler 28, to a receiver. The receiver may be, for example, another mote 20, a central computing device, or any other data receiver. The mote data may include a time and/or date that the data related to a parameter was acquired.

The mote 20 may include a unique identifier, and is operable to communicate the identifier in an association with its sensed parameter. In an alternative embodiment, the mote 20 may include a configuration that determines its location, for example, by a GPS system, by triangulation relative to a known point, or by communication with other motes. Alternatively, the location of the mote 20 may be a known parameter established previously. Similarly, location identification may be associated with data originated and/or forwarded by the mote.

Figure 2:
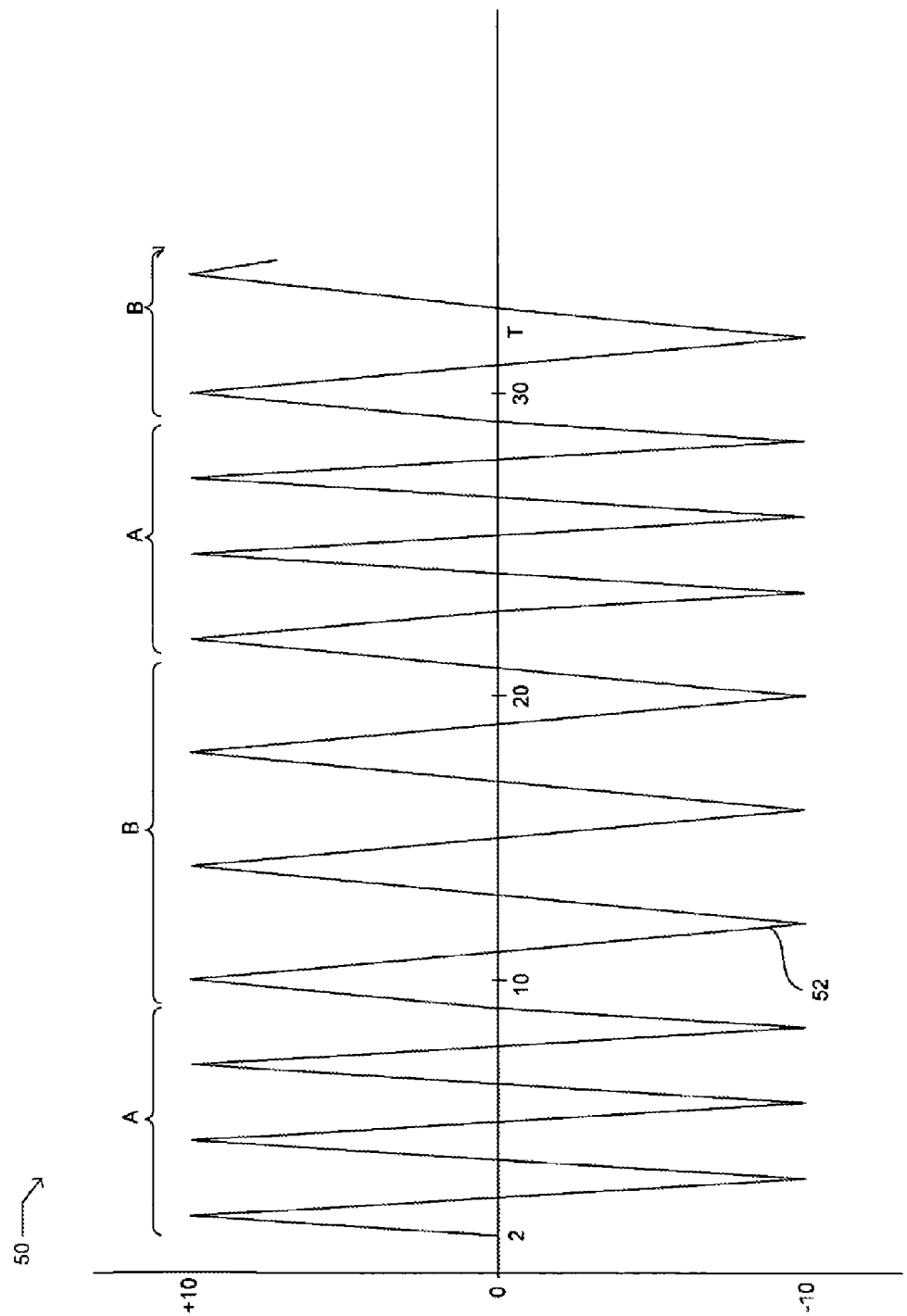
FIG. 2 illustrates a graph of a hypothetical data related to a sensed parameter that may define an occurrence.

FIG. 2 illustrates a graph 50 of a hypothetical chronological sequence 52 of a sensed parameter that may define an occurrence. The sequence 52 illustrates a chronological sequence of a parameter that might be outputted by a mote, and is plotted on the graph 50 with time on an x-axis and amplitude on a y-axis. The sinusoidal sequence 52 includes several representative features. A first representative feature is that the sequence 52 includes only two frequencies, A and B. A second representative feature is that each frequency lasts for three cycles before the sequence 52 changes to the other frequency. A third representative feature is that the sequence 52 amplitude is generally the same over the time T.

For example, assume that an individual user is seeking data representative of a car accident. The car accident is the target-occurrence. Further, assume that a characteristic of a car accident is that an emergency vehicle may approach and/or be present at the scene with its siren activated. Further, assume that it is known that a "do-dah, do-dah, do-dah" type siren used by some emergency vehicles, such as fire, ambulance, or police, generates sound or acoustic waves that include the three features of the sequence 52. Also, assume that the sequence 52 represents a chronological sequence output parameter by an acoustic sensor, such as element 30 of the mote 20 of FIG. 1. Application of one or more pattern recognition criteria that recognizes the three above representative features of a mote data that includes the sequence 52 is likely to locate mote data representative of the car accident occurrence that involved a presence of siren. The mote data may be either from a single mote 20 or a plurality of motes 20.

By way of further example, if the occurrence of interest is passage of an emergency vehicle siren through an intersection monitored by an acoustic sensor, a fourth representative feature would be a Doppler shift in the frequencies A and B on the passage of the vehicle. Expansion of the pattern recognition criteria to include recognition of the fourth feature is likely to locate sensor (or mote) data representative of the passage of the emergency vehicle. This example may be expanded where each intersection in a portion of a city is individually monitored by networked, distributed motes having acoustic sensors. Application of the expanded pattern recognition criteria to the chronological sequences of acoustic data outputted by the motes is expected to locate data representative of the passage of the emergency vehicle through each intersection, including a time of passage. Note that in this example, the siren is a selected target-occurrence while in the above example, the siren is a characteristic of the selected target-occurrence, the car accident.

An occurrence includes anything that may be of interest, for example, to a user, a computing device, or machine. An occurrence may be or include, for example, a reference, an incident, an accident, an event, a real world event, a change in a data sequence, and a change in a time domain. An occurrence may be a high-level matter such as a car crash or a riot, or a lesser-level matter, such as a siren or gun shot. This detailed description uses certain events having a sequence of at least one parameter that may be detected by a mote element to describe embodiments. However, the invention is not so limited.

FIG. 3 is a table illustrating several classes of occurrences, a relationship between an individual occurrence and at least one characteristic or attribute of the individual occurrences, and representative features of the individual characteristics. Table of FIG. 3 illustrates an anticipated relationship between occurrences, characteristics, and features.

For example, occurrence 1 of FIG. 3 is a car crash. A car crash includes a plurality of characteristics or attributes, such as (a) breaking glass, (b) impact noise, (c) tire screech, and (d) approach and presence of emergency vehicles. Each of these characteristics has representative features that can be sensed by one or more motes, such as the mote 20. Characteristic or attribute (a), breaking glass of occurrence 1, a car crash, is expected to include a representative feature of sequential, high, and broadly distributed sound frequencies that would be sensed by an acoustic sensor, such as the mote element 30 of FIG. 1. Characteristic (d), approach and presence of emergency vehicles, is expected to include a representative feature of a siren being sounded as an emergency vehicle approaches a car accident scene. A more detailed example of representative features of a "do-dah, do-dah" siren pattern is described in conjunction with FIG. 2 above. Other types of emergency sirens are expected to have different representative features.

By way of further example, a siren sound, which is a characteristic of occurrence 1, may also be considered an occurrence, and is shown as occurrence 2 of FIG. 3. FIG. 3 also includes examples of fire, armored convey passage, and physical assault as high-level occurrences, and a gun shot as a lesser-level occurrence.

As described above, each occurrence has certain known and/or discoverable features or representative features. In FIG. 2, the graph 50 of the hypothetical chronological sequence 52 of a sensed parameter illustrates three representative features that may correspond to an occurrence.

One or more representative features are selected for recognition of mote data representative of an occurrence of interest, which is also referred to as a target-occurrence. Representative features are features that correspond to a characteristic of an occurrence and provide a data representation of the occurrence. A representative feature may be individually selected by an input-selector, or automatically selected. Any suitable pattern recognition criteria, such as which may be expressed in an algorithm, method and/or device, is used to identify one or more of the selected representative features of a target-occurrence for identification, location, retention, and/or retrieval of mote data corresponding to the target-occurrence. In certain embodiments, the pattern recognition criteria are computer implemented. "Pattern recognition criteria" as used in this specification may include anything that recognizes, identifies, or establishes a correspondence with, one or more representative features of an occurrence. While the fields of pattern recognition and artificial intelligence are sometimes considered as separate fields, or that one is a subfield of the other, pattern recognition as used herein may include methods and/or devices sometimes described as artificial intelligence. Further, pattern recognition may include data or image processing and vision using fuzzy logic, artificial neural networks, genetic algorithms, rough sets, and wavelets. Further, a determination of which features are representative features of a target-occurrence may also be determined using pattern recognition.

Figure 4:
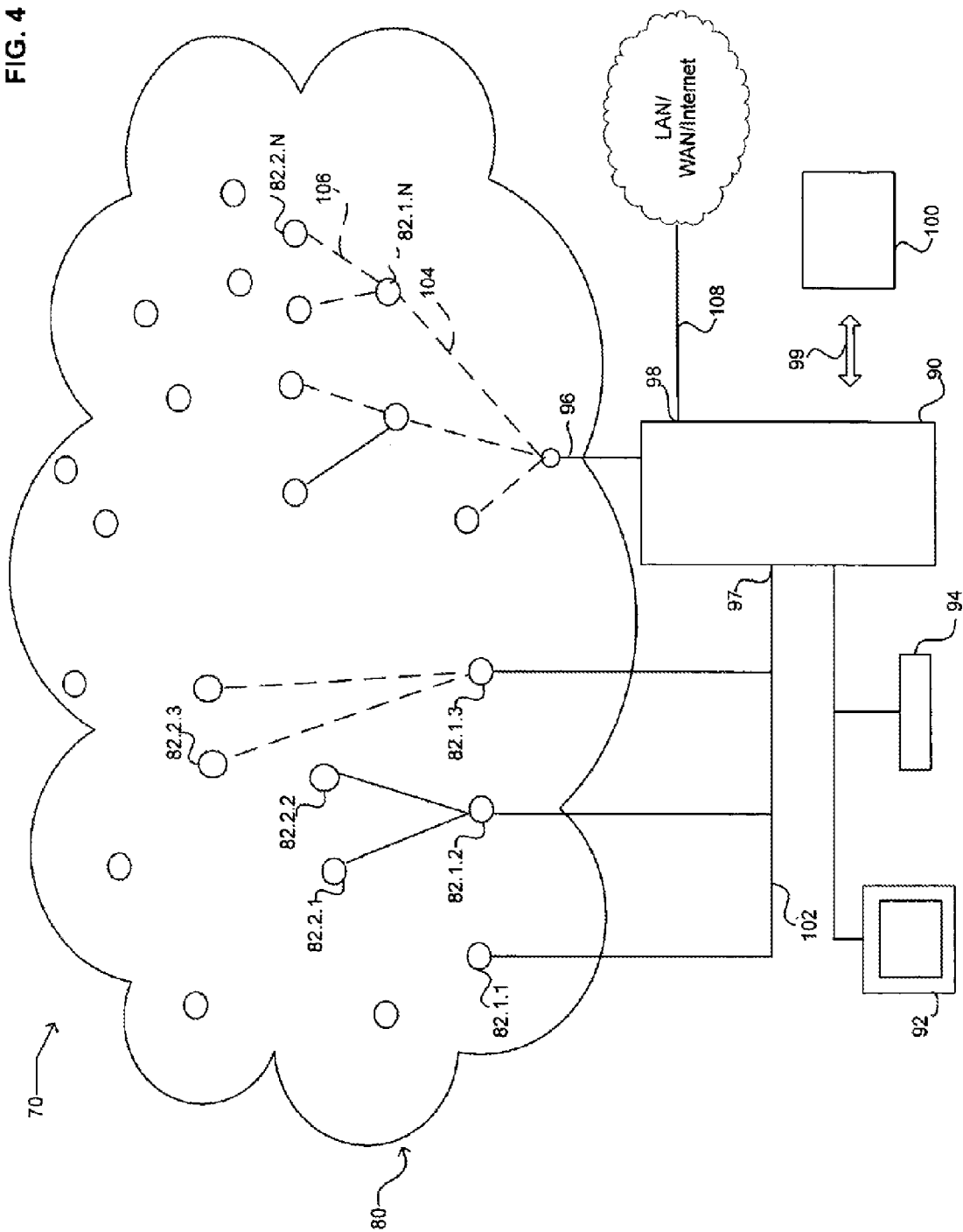
FIG. 4 illustrates a distributed sensor network.

FIG. 4 illustrates a distributed mote network 70 that includes an array of motes 80, a central computing device 90, at least one digital storage device, illustrated as a digital storage device 100, and a plurality of communications links. The motes of the plurality of motes 80 are similar to the mote 20 of FIG. 1. For purposes of illustration, the mote are given reference numbers indicative of their communications tier with respect to the central computing device 90. The first tier has reference numbers 82.1.1-82.1.N, and the second tier has reference numbers 82.2.1-82.2.N. Additional tiers are not numbered for clarity. Each mote in the array of motes 80 may sense a same parameter. Alternatively, a plurality motes of the array of motes 80 may respectively sense different parameters. For example, the mote 82.1.1 may respectively sense acoustical pressure and mote 82.1.2 may respectively sense temperature. The respective parameters sensed by the individual motes may be mixed and matched in any manner to provide a desired parameter description of the area in which the array of motes 80 are deployed.

In an embodiment, the individual motes of the plurality of motes 80 of the mote network 70 are typically distributed, that is they are physically separated from each other. However, in certain embodiments, motes that sense different parameters are grouped in proximity to provide a more complete data related to a location. Further, in an embodiment, the motes of the array of motes 80 are distributed over a geographical area. Such distributed motes may include sensing "real world" environmental parameters occurring in a locale of each mote, for example and without limitation, weather, car crashes, and gunshots. In another embodiment, the motes of the array of motes 80 are distributed in a manner to sense a parameter related to a physical entity, such as, for example and without limitation, individual pieces of a distributed equipment, such as traffic lights or cell-phone transmission towers, or a locale, such as seats in a stadium.

An exemplary system implementing an embodiment includes a computing device, illustrated in FIG. 4 as a central computing device 90. In its most basic configuration, the computing device 90 typically includes at least one central processing unit, storage, memory, and at least some form of computer-readable media. Computer readable media can be any available media that can be accessed by the computing device 90. By way of example, and not limitation, computer-readable media might comprise computer storage media and communication media.

Computer storage media includes volatile and nonvolatile, removable and non-removable media implemented in any method or technology for storage of data such as computer readable instructions, data structures, program modules or other data. Computer storage media includes, but is not limited to, RAM, ROM, EPROM, flash memory or other memory technology, CD-ROM, digital versatile disks (DVD) or other optical storage, magnetic cassettes, magnetic tape, magnetic disk storage or other magnetic storage devices, or any other medium that can be used to store the desired data and that can be accessed by the computing system 90. The computer storage media may be contained within a case or housing of the computing device 90, or may be external thereto.

Communication media typically embodies computer-readable instructions, data structures, program modules or other data in a modulated data signal such as a carrier wave or other transport mechanism and includes any information and/or delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. Combinations of any of the above should also be included within the scope of computer-readable media. Computer-readable media may also be referred to as computer program product.

The digital storage device 100 may be any form of a computer data digital storage device that includes a computer storage media, including the forms of computer storage media described above. The digital storage device 100 may be a local digital storage device contained within a case housing the computing device 90. Alternatively, the digital storage device 100 may be a local and external digital storage device proximate to the computing device 90, or remote to the computing device, and that coupled to the computing device 90 in either case by a communications link 99.

The computing device 90 also includes communications ports that allow the computing device to communicate with other devices. More specifically, the computing device 90 includes a port 97 for a wired communication link, such as the wired communication link 102 providing communications with at least one mote of the array of motes 80. The computing device 90 also includes a wireless transceiver or receiver coupled with a communications coupler, such as the antenna 96, for wireless communication over a link, such as the wireless communication link 104. The wireless communications link 104 provides wireless communications with at least one mote of the array of motes 80. The wireless communication link 104 may include an acoustic, radio frequency, infrared and/or other wireless communication link. The computing device 90 further includes a port 98 for wired, wireless, and/or optical communication over a communication link 108 with a network, such as a local area network, wide area network, and Internet. Such networking environments are commonplace in offices, enterprise-wide computer networks, intranets and the Internet. The communications link may include an acoustic, radio frequency, infrared and other wireless connection.

The computing device 90 may also have input device(s) 94, such as keyboard, mouse, pen, voice input device, touch input device, etc. The computing device 90 may further have output device(s) 92, such as a display, speakers, printer, etc. may also be included. Additionally, the computing device 90 may also have additional features and/or functionality.

The computing device 90 may be implemented in any suitable physical form, including a mainframe computer, a desktop personal computer, a laptop personal computer, and a reduced-profile portable computing device, such as a PDA or other handheld device.

Logical operation of certain embodiments may be implemented as a sequence of computer implemented steps, instructions, or program modules running on a computing system and/or as interconnected machine logic circuits or circuit modules within the computing system. The implementation is a matter of choice dependent on the performance requirements of the computing system implementing and embodiment. In light of this disclosure, it will be recognized by one skilled in the art that the functions and operation of various embodiments disclosed may be implemented in software, in firmware, in special purpose digital logic, or any combination thereof without deviating from the spirit or scope of the present invention.

Figure 5A:
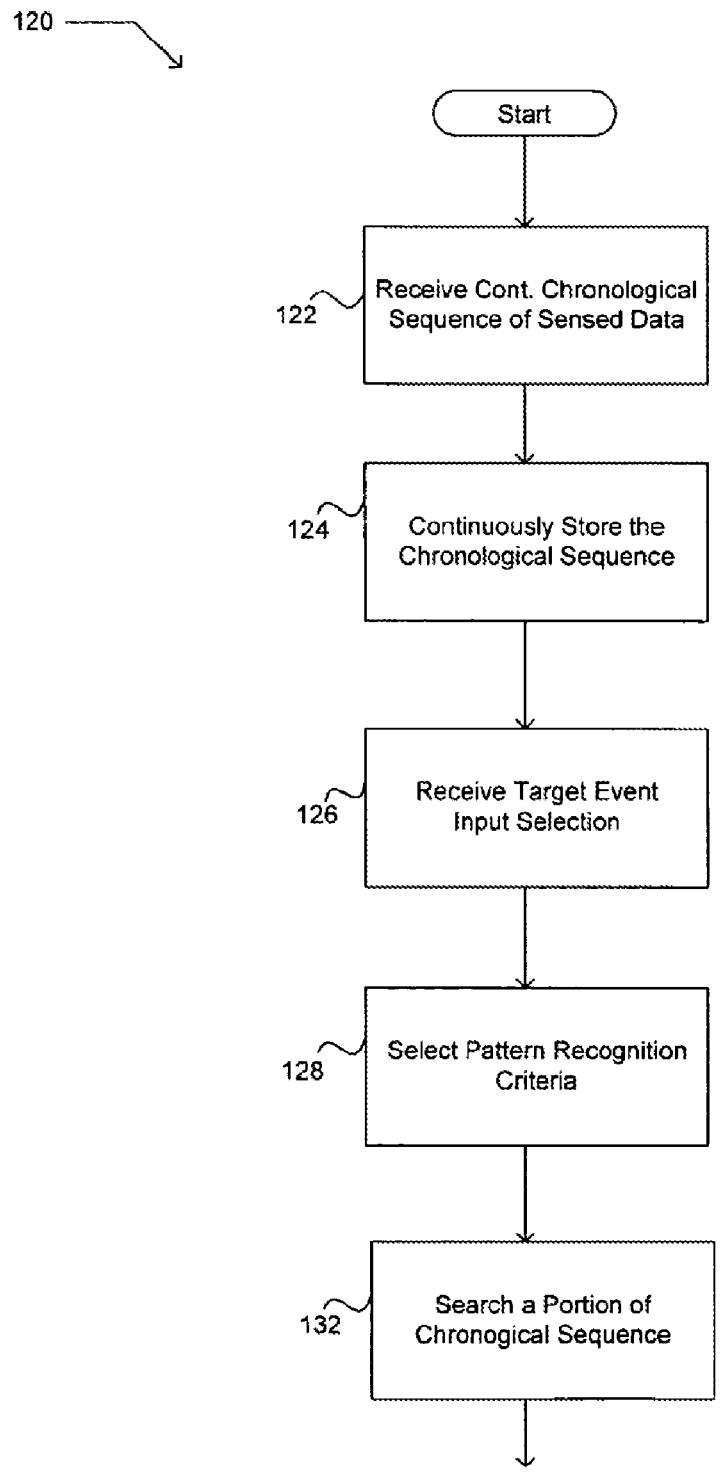
FIGS. 5A and 5B include a flow diagram illustrating an exemplary process in which sensor data correlating to a target-occurrence is acquired from a sensor network and stored.
Figure 5B:
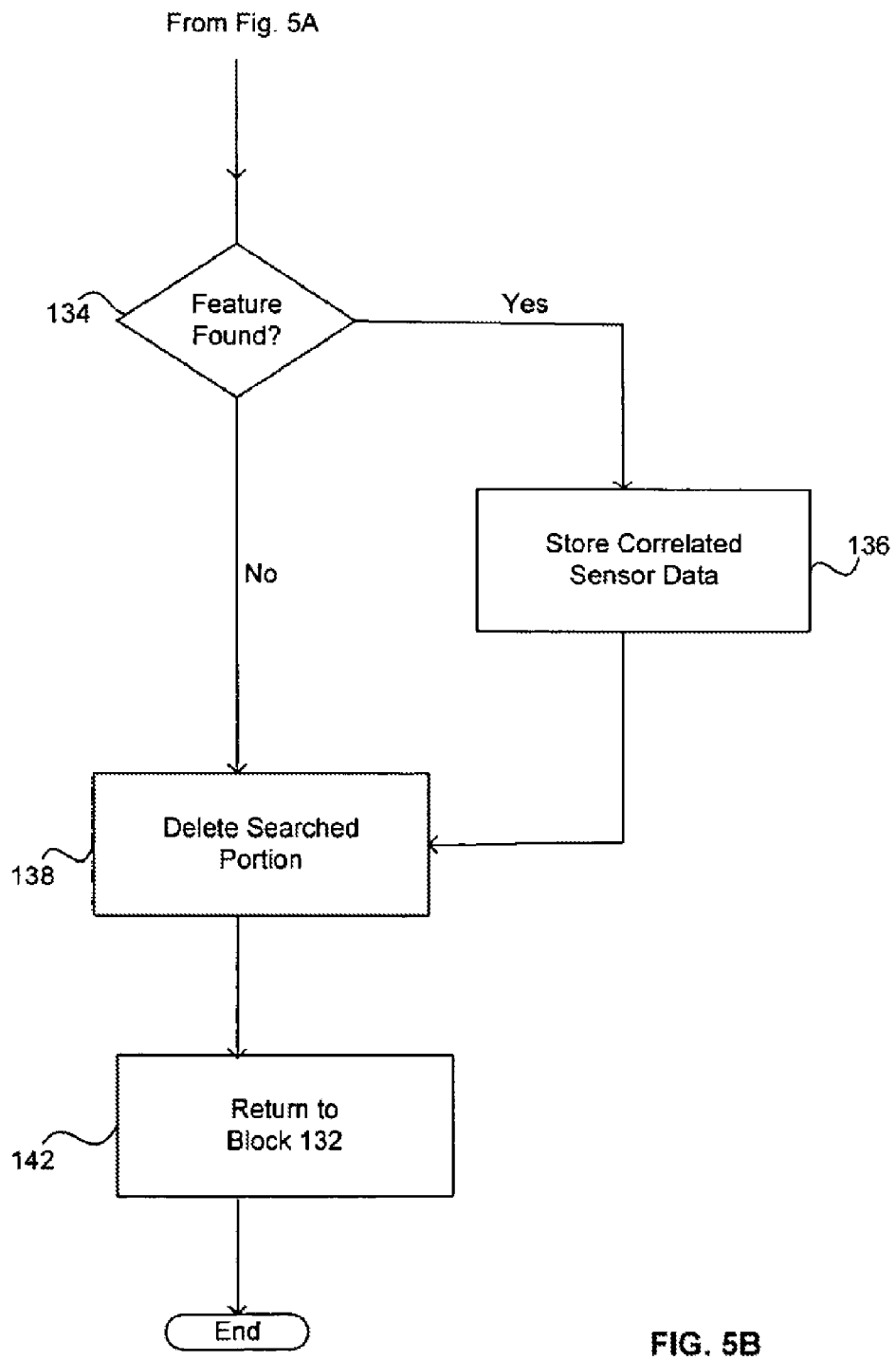

FIGS. 5A and 5B include a flow diagram illustrating an exemplary process 120 in which mote data correlating to a target-event is acquired from a mote network and stored. In certain embodiments, the process 120 is implemented in a central computer, such as the computing device 90 of FIG. 4. In other embodiments, at least a portion of the process 120 is implemented in a mote of an array of motes, such as the mote array 80 of FIG. 4.

After a start block, the process 120 moves to block 122. At block, 122, a computing device, such as the central computing device 90, continuously receives sensed data of at least one parameter from a mote over a communications link. The mote may be any mote, such as the mote 82.1.2, 82.1.N, or 82.2.2 of the array of motes 80 of FIG. 4. The communications link may be any communications link known in the art, for example and without limitation, an optical, a wireless, and/or a wired link. For example, FIG. 4 illustrates the mote 82.1.2 communicating over the wired communications link 102, and the mote 82.1.N communicating over the wireless communications link 104. FIG. 4 also illustrates the mote 82.2.2 communicating over a wireless link 106 with the mote 82.1.3, which then relays and communicates the data from the mote 82.2.2 with the computing device 90 over the wired communications link 102.

Optimally, the sensed data is transmitted at intervals and aggregated into the data related to the sensed at least one parameter by a receiving device. In an alternative embodiment, the sensed data may be transmitted continuously by the mote. Furthermore, in another embodiment, the sensed data may include continuously sampled data at a predetermined sampling rate, such as a temperature reading captured during the first minute of every five-minute interval, or such as a digital image captured once each second.

At block 124, the received sensed data is continuously stored in a storage device, such as the storage device 100, as first sensor (or mote) data set. In an alternative embodiment, the first data set includes a multi-element data structure from which elements of the data related to the sensed at least one parameter can be removed only in the same order in which they were inserted into the data structure. In another alternative embodiment, the first data set includes a multi-element data structure from which elements can be removed based on factors other than order of insertion.

At block 126, an input selection is received from an input-selector of a target-event having at least one representative feature. In a certain embodiment, the input-selector includes a user, who inputs the selection of the target-event using the user input device 94 of FIG. 4. The user may select the target-event from a list of possible target-events displayed on the user output device 92. The list for example, may be similar to the list of occurrences of FIG. 3. In other embodiments, the input-selector includes a machine, or a program running on a computing device, such as the computing device 90.

In an embodiment, the input selection of the target-event may include a selection an event that is directly of interest. For example, a sound pattern of interest, such as the siren sound that is event 2 of FIG. 3. In another embodiment, the input selection of the target-event may be formulated in terms of a parameter that correlates to the event that is directly of interest. For example, where the event of interest is a fire, the input may be formulated in terms of a siren sound indicating an approach or presence of emergency vehicles. The siren sound is characteristic (a) of a fire, which is event 3 of FIG. 3.

In a further embodiment, the input selection of the target-event is formulated in terms of weighing and/or comparing several instances of a sensed data of at least one parameter from a plurality of motes to determine which of the several instances provide a good representation of the target-event. For example, the input selection may request the best sensed data from six motes, such as the best sensed data from six motes that heard a gun shot during a time period.

At block 128, a pattern recognition criteria corresponding to at least one representative feature of the target-event is selected. In an embodiment, the method includes at least one representative feature of each possible target-event. The process automatically selects one or more pattern recognition criteria for recognition of mote data representative of or corresponding to the target-event. In certain embodiments, the pattern recognition criteria are included with the process 120, or available to the process from another source. For example, pattern recognition criteria may be associated locally with the computing device 90, or available to it over a communications link, such as the communications link 108. In a further embodiment, pattern recognition criteria are provided to the computing device by the input-selector in conjunction with the input of selection of the target-event.

At block 132, in response to the input selection corresponding to the target-event, the first mote data set is automatically searched for data correlating to the at least one target-event representative feature using the selected pattern recognition criteria.

In a certain embodiment, the received input selection of the target-event further includes a selection of a representative feature of the target-event. The inputted selection of a target-event representative feature may be any feature that the input-selector chooses for searching mote data. For example, the selected representative feature may include a time period and acoustic frequency components. The acoustic frequency components may include a selected frequency pattern, such as a recognized word, set of words, breaking glass, dog bark, door opening, alarm, threshold acoustic level, and voiceprint. The selected representative feature may include a selected electromagnetic pattern, such as a visible light, infrared light, ultraviolet light, and radar. In this embodiment, at block 128, a pattern recognition criteria is automatically selected by instructions in response to the selected representative feature. Further, at block 132, the first mote data set is automatically searched using the pattern recognition criteria selected in response to the inputted representative feature.

At decision block 134, a determination is made if mote data correlating to the at least one target-event representative feature was found. If the mote data is not found, the process branches to block 138. If the mote data is found, the process branches to block 136. At block 136, the instructions cause the computing device 90 to store the correlated mote data in a retained data storage. The retained data storage may be at any location. For example and without limitation, the retained data storage may be local to the central computing device 90, such its removable or non-removable media; it may included in the digital storage device 100; or it may be a remote digital storage device associated with the computing device 90 over a communications link, such as the communications link 108. In an embodiment, access to the retained data storage is restricted to authorized users. After storage of the correlated mote data in a retained data storage, the process moves to block 138.

In certain embodiments, in addition to storing the mote data correlating to at least one target-event representative feature, the process includes storing a portion of the mote data that was sensed before the found target-event representative feature. In other embodiments, the instructions include storing a portion of the mote data that was sensed after the found target-event representative feature. In still other embodiments, the instructions include storing a portion of the mote data that was sensed both before and after the found target-event representative feature. These embodiments allow data occurring before and/or after the representative features to be saved.

In another embodiment, the process includes assigning a tentative event-identifier to the correlated mote data. For example, if the target-event is a fire, and if a search of the first data set for data correlating to at least one fire event representative feature finds correlating mote data, the process includes association of a tentative event-identifier, such as "fire," with the correlated mote data. The trial-event identifier is associated with the stored correlated mote data at block 136.

At block 138, the data related to the sensed at least one parameter is continuously deleted from the first data set according to a deletion sequence. In an embodiment, the deletion sequence includes a substantially first-in, first-out order. In another embodiment, the deletion sequence includes a factor other than order of insertion into the data set.

At block 142, the process returns to block 132 to search another portion of the continuously received sensed data. The process continues while the continuous sensed data is received. The instructions then move to the stop block.

An embodiment provides a computer implemented process for searching the data related to the sensed at least one parameter from the first data set and storing correlated mote data for both the target-event as described above and another target-event before deletion of the data from the first data set. In an alternative embodiment, another input selection is received corresponding to another target-event having at least one representative event feature. The input selection is received in a manner substantially similar to block 126. In a manner substantially similar to block 128, another pattern recognition criteria is automatically selected corresponding to at least one of the representative features of the selected another target-event.

In a manner substantially similar to block 132, in response to the input selection corresponding to the another target-event, the first mote data set is automatically searched for data correlating to the at least one target-event feature of the another target-event using the selected pattern recognition criteria. In a manner substantially similar to decision block 134, if mote data correlating to the at least one target-event representative feature of the another target-event is found, the correlated mote data is stored in the same retained data storage used to store representative features of the first target-event, or another retained data storage.

A further embodiment includes substantially simultaneously storing correlated mote data for the target-event from two motes, each mote generating separate data related to a same or a different sensed parameter. In such an embodiment, two parallel instances of sensed parameters are searched by the computing device 90 of FIG. 3 for data correlating to at least one representative feature of the target-event. In a manner substantially similar to block 122, data related to a sensed parameter from a second mote of the plurality of distributed motes is continuously stored into a second mote data set.

In a manner substantially similar to block 132, in response to the input selection corresponding to the target-event, the second mote data set is automatically searched for data correlating to the at least one target-event representative feature using the selected pattern recognition criteria. In a manner substantially similar to decision block 134, if mote data correlating to the at least one target-event representative feature of the target-event is found in the second data set, the second correlated mote data is stored. The storage location may be the same retained data storage used to store representative features of the first target-event, or another retained data storage.

Yet another embodiment provides a process that substantially simultaneously stores correlated mote data for a plurality of target-events from a respective plurality of motes, each mote generating a separate data related to a same or a different sensed parameter. The manner and method of scaling the computer process 120 for the parallel and substantially simultaneous storing of correlated mote data may be done in any manner known to those in the art.

Another embodiment includes using the computing power and storage of a mote, such as the mote 20 of FIG. 1, to run at least a portion of the process 120. In conjunction with block 126 of FIG. 5A, the target even input selection may be preloaded into the mote, or may be communicated to the mote over a communications link. Similarly, in conjunction with block 128, the pattern recognition criteria may also be preloaded into the mote, or may be communicated to the mote over a communications link. At block 136, the retained data storage that stores the correlated mote data may be local to the mote, such as the digital storage 25 of FIG. 1. The process 120 includes the mote transmitting at least a portion of the stored correlated mote data over a communications link to a central computing device, such as the central computing device 90 of FIG. 4. The process 120 may further include deleting the stored mote data after the data has been communicated to the central computing device. In an alternative embodiment, the process 120 includes the mote transmitting the stored correlated mote data to the central computing device in response to a pull by the central computing device. In another alternative embodiment, the process 120 includes the mote pushing the stored correlated mote data to the central computing device.

Alternatively, at block 136, the retained data storage may be the digital storage device 100 of the central computing device 90 of FIG. 4. The process 120 may include instructions that cause the mote to transmit at least a portion of the found correlated mote data to the digital storage device 100 for an initial storage.

An embodiment includes a communication media embodying the process 120, which, when implemented in a computer, causes the computer to perform a method. For example, in an embodiment where the process 120 is implemented in a computing device, such as the computing device 90 of FIG. 4, instructions embodying the process are typically stored in a computer readable media, such as without limitation the storage media and memory of the computing device, and loaded into memory for use.

A further embodiment includes a method implementing the steps of the computerized process 120, and a computer readable carrier containing instructions which, when implemented in a computer, cause the computer to perform the method of the computer process 120.

An exemplary system employing certain embodiments described above may be illustrated by a network system of distributed motes having acoustic sensors (or acoustic motes) placed on a plurality of city traffic lights. While the illustrative system describes the networked system as owned by the city maintaining the traffic lights, the exemplary system may have any ownership, such as a private, public, and governmental, and may be used for any purpose, such as private, public, governmental, and military.

The exemplary system includes an orientation toward gathering and storing acoustic event data for later identification and retrieval. The individual nodes may use the power supplied to the traffic light as their power source, or alternatively, use long-life batteries or solar power. The individual nodes may communicate with a central computing device by sending mote data over the power lines serving the traffic light, separate wire communication links, or wireless communications links. An event-data storage program embodying certain embodiments described above is operating on the central computing device. Depending on the city's need to accumulate mote data and total digital data storage space requirements, a digital storage device within the central computing device case may be used, or at least one local larger capacity device proximate to the central computing device may be used.

In operation of the exemplary system, each mote transmits data related to sensed acoustic data generated by their acoustic sensor element to the central computing device. While the sensed acoustic data may be transmitted continuously by each mote, optimally in this embodiment to conserve bandwidth, the data is temporarily stored in the mote and transmitted to the central computing device in batches. A portion of sensed acoustic data for each mote in the network, including an identification of the originating mote, is received by the event-data storage program operating on the central computing device and stored in a data set queue in the associated digital storage device. Optimally, the sensed acoustic data for each mote is stored in a separate data set queue. This illustrative system contemplates that two things occur before the sensed acoustic data is received. First, the event-data storage program receive at least one target-event input selection. Second, a pattern recognition criteria corresponding to at least one of the representative features of the target-event be selected. For this exemplary system, the selected target-events are a gunshot, siren, tire screech, and loud voices. The event-data storage program automatically searches each mote data set for sensor data having representative features correlating to a gunshot, siren, tire screech, or loud voices using the selected pattern recognition criteria. If mote data correlating to a representative feature of a gunshot, siren, tire screech, and loud voices is found, the program stores the correlated mote data in a retained data storage. The retained data storage may have sufficient capacity to archive correlated event-data for a predetermined time period, such as a week, a month, a year, or multiple years.

Optimally, the program also associates and stores a tentative event-identifier, such as gunshot, siren, tire screech, or loud voices, with the correlated mote data. The associated tentative event-identifier will allow city officials to search the correlated mote data by identifying and event from gunshot, siren, tire screech, or loud voices, and searching the retained data storage by tentative identifiers instead of what may be a more complicated search use pattern recognition criteria. After the batch sensed acoustic data is searched, the program automatically deletes the mote acoustic data from the data set queue. The deletion minimizes the amount of digital data storage necessary in the system by saving only mote data correlating to selected target-events.

While the above exemplary system includes gathering and storing event-data on a non-real-time basis for later retrieval, an embodiment allows the system to perform real-time tentative identification of one or more target-events and save correlating mote data. For example, motes having sufficient computing capacity may be preloaded with one or more input target-event selections. Each mote would automatically and in substantially real-time search mote data generated by its local mote element for mote data correlating to the input target-event selection. Instead of storing for later transmission, the found correlating mote data would be immediately transmitted to the central computing device and be available for use. The data transmission may include associated tentative event-identifiers. In effect, the motes filter their acoustical data and only provide mote data to the central computing device that corresponds the inputted target-event selection. The event-data program may then store the found correlating mote data, and notify a user in substantially real-time of receipt of data having the tentative target identifiers. The notification may be by a display on a monitor screen coupled with the central computing device. The user may then listen to the correlated mote data and take appropriate action, such as notifying police or fire.

Another embodiment includes a mobile central computing device that a user takes into communication range with a network of remote motes. A mobile computing device, such as a laptop and a reduced-profile computing device, provide mobility to the computing device 90. The mobility allows a user to take the central computing device 90 into the field and within transmission range of certain motes of a distributed network of remote motes. The motes typically have acquired and stored a plurality of mote data sets, each mote data set representing a respective feature sensed by a mote element of its respective mote. A communication link, typically a wireless link, is established between the computing device 90 and one or more of the motes of the array of motes 80 of the network of remote or distributed motes 70. The user inputs a selection of mote data sets to be transmitted from the certain motes to the computing device 90. In response, a process running on the computing device 90 communicates with the one or more motes, extracts the mote data sets, stores them, and provides a confirmation to the user that the selected mote data sets have been received. The user typically will receive the confirmation and move the computing device into communication proximity to other motes of the array of motes 80. Typically, the stored plurality of mote data sets are deleted from the motes after transmission to the computing device 90 to free-up storage.

FIG. 6 illustrates a distributed mote event-data archival and retrieval system 150. The system 150 includes a plurality of distributed mote networks, illustrated as first, second, and third distributed mote networks 70, 152, and 162 respectively. The distributed mote network 70 is described in conjunction with FIG. 4, and the mote networks 152 and 162 are substantially similar to the mote network 70. Each distributed mote network includes an array of motes, illustrated as a first, second, and third arrays 80, 154, and 164 respectively. Each mote network also includes at least one central computing device, illustrated as first, second, and third central computing devices 90, 156, and 166 respectively, and includes a plurality of communications links. The arrays of motes 154 and 164 are substantially similar to the array of motes 80 described in conjunction with FIG. 4. For clarity, only several motes and their communications links are illustrated in the arrays 80, 154, and 156 in FIG. 6.

The system 150 also includes an aggregating computing device 170 that is substantially similar to the central computing device 90 of FIG. 4. The words "central," "aggregating," "collecting," and "archival" are used in this specification, including the claims, to identify certain devices and to illustrate a possible network hierarchy environment of one or more embodiments. These words do not limit the nature or functionality of a device. The system 150 illustrates a possible network hierarchy where, in an embodiment, a plurality of central computing devices, illustrated as the central computing devices 90, 156, and 166, receive and store mote data from a plurality of mote arrays, illustrated as the motes of the arrays 80, 154, and 164 respectively. The system 150 also illustrates a possible network hierarchy where, in an embodiment, the aggregating computing device 170 receives and stores, i.e., aggregates, mote data acquired by a plurality of central computing devices, illustrated in FIG. 6 as central computing devices 90, 156, and 166. In another embodiment, the computing device 170 may function as a central computing device providing mote data it received and stored to another aggregating computing device (not illustrated).

The computing device 170 communicates with at least one remote digital data storage device, such as storage devices 100, 158, and 168, through their associated computing devices 90, 156, and 166, respectively, using one or more communications links. As illustrated in FIG. 6, the aggregating computing device 170 also includes communications ports that allow the computing device to communicate with other devices. These communications ports are substantially similar to the communications ports of the computing device 90 of FIG. 4. More specifically, the computing device 170 includes a mote communication port 177 for a wired communication link, such as the wire communication link 189, providing communications with the central computing device 156 and its associated digital data storage device 158. The computing device 170 also includes a wireless transceiver or receiver coupled with a communications coupler, such as an antenna 176, for wireless communication over a communications link, such as a wireless communication link 186. FIG. 6 illustrates the wireless communication link 186 coupling the computing device 170 and the computing device 166, and its associated digital data storage device 168. The computing device 170 further includes a network communications port 178 for wired, wireless, and/or optical communication over a communication link, such as the network communications link 188, for communication with a network, such as a local area network, wide area network, and Internet. FIG. 6 also illustrates a communications link 188 as network link between the central computing device 90 and its associated digital storage device 99. The communications link 188 may include an acoustic, radio frequency, infrared and other wireless connection.

The system 150 also includes at least one digital storage device as an event-data archive, illustrated as an archival digital data storage device 190, which may be substantially similar to the digital data storage device 100 of FIG. 4. The archival digital storage device 190 may be a local digital data storage device contained within a case housing the computing device 170. Alternatively, the archival digital storage device 190 may be a local and external digital data storage device proximate to the computing device 170, or it may be remote to the computing device. The archival digital data storage device 190 is coupled to the computing device in any event by a communications link 179.

The aggregating computing device 170 may also have input device(s) 174, such as keyboard, mouse, pen, voice input device, touch input device, etc. The computing device 170 may further have output device(s) 172, such as a display, speakers, printer, etc. may also be included. Additionally, the computing device 170 may also have additional features and/or functionality.

FIG. 7 is a flow diagram illustrating an exemplary process 200 that aggregates and stores a plurality of instances of correlated mote data in an event-data archive. After a start block, the process 200 moves to block 202. At block, 202, a plurality of central computing devices, such as the central computing devices 90, 156, and 166, each transmit a plurality of instances of correlated mote data to an aggregating computing device. The instances of correlated mote data are typically acquired by a mote operable to sense at least one parameter, and each instance has been correlated to an event having at least one representative feature. The instances may be stored in one or more digital data storage devices, such as the storage devices 100, 158, and 168, associated with the central computing devices 90, 156, and 166, respectively. In an alternative embodiment, at least one digital data storage device is remote to its associated computing device. The remote digital data storage device may be included in one or more motes.

In the embodiment illustrated in FIG. 6, the correlated mote data is accessed from the storage devices 100, 158, and 168 by their associated central computing devices 90, 156, and 166, and transmitted over their associated communications links 108, 186, and 189, to the aggregating computing device 170. In an embodiment, each instance of the mote data was acquired by at least one mote of a plurality of distributed motes, and each mote is part of a network of motes. Further, each instance of correlated mote data may include an associated tentative event-identifier, which typically is generated and associated when the instance of correlating mote data was found.

In an alternative embodiment (not illustrated), instances of correlated mote data are pulled from the digital data storage devices in response to a request communicated to their respective central computing devices by the aggregating computing device 170. In another embodiment, instances of correlated mote data are transmitted or pushed from the digital data storage devices by their associated central computing device to the aggregating computing device 170.

At block 204, the plurality of instances of correlated mote data are received. At block 206, the plurality of instances of correlated mote data are stored in an aggregating digital data storage device, such as the digital data storage device 190. The aggregating digital data storage device may be referred to in this specification as an event-data archive. In an alternative embodiment, the plurality of instances of mote data stored in the event-data archive are protected by an information security measure. Such a protected or secured stored data arrangement may be referred to in this specification as a "data vault" or "data lock-box."

The information security measure typically includes providing at least one of maintaining information confidentiality, maintaining information integrity, and limiting access to authorized persons. The information security measure may be any security measure known to those skilled in the art, and at a selected level commensurate with the value of the information contained in the instances of correlated mote data and any loss that might accrue from improper use, disclosure, or degradation. The information security measure may be implemented in software, hardware, infrastructure, networks, or any other appropriate manner. In an embodiment, the information security measure may be associated with the digital data storage device, the plurality of instances of correlated mote data, and/or a computing device having a communication link with the digital data storage device.

Next, at block 208 the process 200 waits for more event data. If additional event data is received, the process moves to block 204 and receives the additional event data. The process 200 then proceeds to the stop block. In an alternative embodiment, the process 200 includes deleting at least a portion of the instances of correlated mote data from the digital data storage devices 100, 158, and 168 after the instances have been transmitted to the aggregating computing device.

The process 200, when implemented in a computing device, causes the computing device to perform certain steps. For example, in an embodiment where the process 200 is implemented in a computing device, such as the aggregating computing device 170 of FIG. 6, the instructions are typically stored in a computer readable media, such as the storage media and/or memory of the computing device, and loaded into memory for use. In certain embodiments, the process 200 aggregates instances of mote data correlating to an event from a plurality of remote digital data storage devices, and stores those instances on a digital data storage device associated with an aggregating computer as an event-data archive, such as the archival digital data storage device 190 of FIG. 6.

Figure 8:
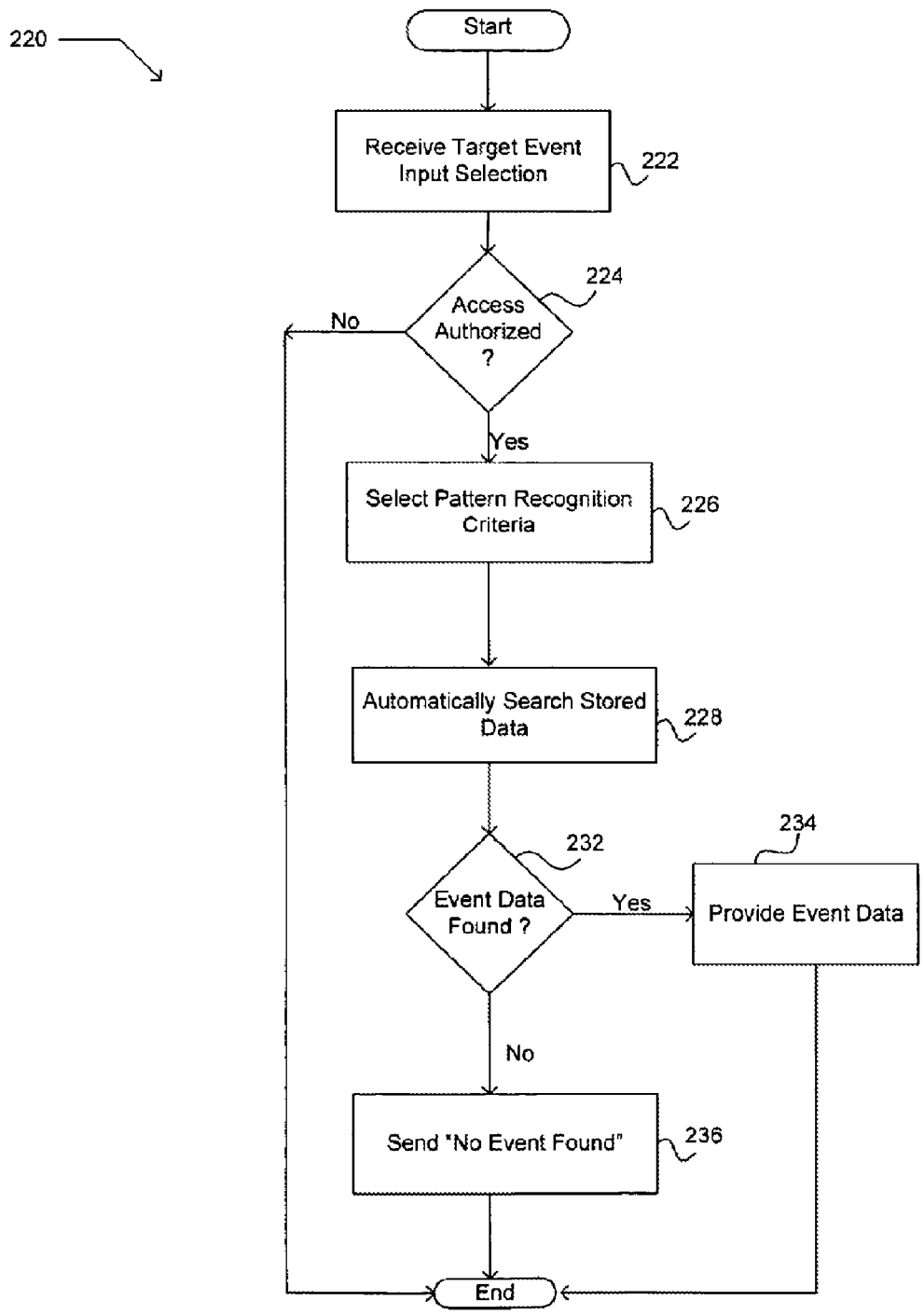
FIG. 8 is a flow diagram that illustrates exemplary steps of a process that searches and retrieves certain instances of stored correlated sensor data from an occurrence-data archive.

FIG. 8 is a flow diagram that illustrates exemplary steps of a process 220 that searches and retrieves certain instances of stored correlated mote data from an event-data archive. After a start block, the process 220 moves to block 222. At block 222, an input selection is received from an input-selector corresponding to a target-event having at least one representative feature. The input-selector may include any entity, such as a machine, a computing device, and a user.

The input selection optimally further includes the input-selector tendering an access authorization, which is used to determine if the input-selector is a trusted entity. The tendered access authorization may be by any method or device required by a security measure protecting the instances of stored mote data from unauthorized access, such as for example, a password, and thumb print. For example, a trusted entity may be a user, machine, or computing device, identified on a list of trusted parties. For example, the list of trusted parties may include employees and/or computing devices associated with the owner of the mote network system. The tendered access authorization may be the input-selector's personal identification. Further, a trusted entity may be a member of a certain class, such as uniformed law enforcement officers, or computing devices maintained by agencies that employ uniformed law enforcement officers. For example, uniformed law enforcement officers may include members of the Federal Bureau of Investigation, Alcohol Tobacco and Firearms, state patrol, county sheriffs, and local police. Another example of a trusted party class is a prosecuting attorney, a defense attorney, and a judicial officer.

In a less preferred embodiment, the instances of stored mote data are not protected by a security measure, and the input selection does not include tender of an access authorization.

At block 224, a decision operation determines if the tendered access authorization establishes the input-selector is a trusted entity and possesses an access right to the stored correlated mote data. If the input-selector is a trusted entity and has an access right, the process branches to block 226. If the input-selector does not possess an access right, the process branches to the end block. If a security measure is not protecting the instances of stored mote data, then the decision block 224 is not necessary and the process moves from decision block 222 to block 226.

At block 226, a pattern recognition criteria is selected corresponding to at least one representative feature of the target-event. The criteria is selected in a manner substantially similar to block 128 described in conjunction with FIGS. 5A and 5B, including the alternative embodiments. At block 228, in response to the input selection corresponding to the target-event, a plurality of instances of stored mote data are automatically searched for data correlating to the target-event using the selected pattern recognition criteria.

At decision block 232, a decision operation determines if mote data correlating to the at least one target-event representative feature is found. If the mote data correlating to the target-event is not found, the process branches to block 236, where a message equivalent to "no data found" is provided. If mote data correlating to the target-event is found, the process branches to block 234.

At block 236, the found correlated mote data is provided. In an embodiment, the input-selector is the recipient of the correlated mote data. In another alternative embodiment, a third party is the recipient of the correlated mote data. The third party may include a machine, a computing device, and a user. In a further embodiment, the input-selector selects a third party recipient of the correlated mote data. In an alternative embodiment, the process at block 222 further includes receiving an access authorization of the third part tendered by the input-selector, and the process at decision block 224 further includes determining if the third party recipient possesses an access right before providing the correlated mote data to the third party. The process 220 then moves to the end block.

In a further alternative embodiment of the process 220, the search at block 228 proceeds in response to an input-selector designation of a target tentative-event-identifier. In this embodiment, the received plurality of instances of correlated mote data each include an associated tentative-event-identifier. At block 222, the received target-event selection includes an input selection corresponding to a target tentative event-identifier. If a target tentative event-identifier is selected and no reason exists to search for a representative feature, the block 226 may be bypassed. At block 228, in response to the input selection corresponding to the target tentative event-identifier, the plurality of instances of mote data are automatically searched for data correlating to the target tentative event-identifier. If any event data is found correlating to the target tentative event-identifier at decision block 232, the found mote data correlating to the target tentative event-identifier is provided at block 234.

The process 220, when implemented in a computing device, causes the computing device to perform steps. In certain embodiments, the process 220 implements a process that searches and retrieves instances of stored mote data from an event-data archive protected by a security measure, such as the archival digit data storage device 190 coupled to the computing device 170 of FIG. 6. In other embodiments, the process 220 uses a local computing device to search and retrieve instances of stored mote data from remote digital data storage devices, such as the digital data storage device 168.

The process 220, when implemented in a computing device, causes the computing device to perform certain steps. For example, in an embodiment where the process 220 is implemented in a computing device, such as the aggregating computing device 170 of FIG. 6, the instructions are typically stored in a computer readable media, such as the storage media and/or memory of the computing device, and loaded into memory for use.

An exemplary system employing certain embodiments described above may be illustrated by three network systems of distributed motes, and an aggregating computing device.

Referring to FIG. 6, the illustrative exemplary system includes the previously described exemplary network system of distributed acoustic motes (or motes having acoustic sensors) placed on city traffic lights as the first mote network 70, an exemplary network system of distributed digital image capture devices located in city parking garages and lots as the second mote network 152, and an exemplary network of distributed heat/fire thermal motes located in city buildings as the third mote network 162. Each exemplary mote network automatically stores correlated mote data in an associated retained data storage, such as the digital data storage devices 100, 158, and 168.

As with FIG. 4, while the illustrative exemplary system describes the networked system as owned by the city, the illustrative exemplary system may have any ownership, such as a private, public, and governmental, and may be used for any purpose, such as private, public, governmental, and military. Further, the mote networks may have different owners. For example, the first mote network 70 may be owned by the city, the second mote network 152 may be privately owned by a parking garage operator, and the third mote network 162 may be privately owned by a fire alarm company.

The illustrative exemplary system further includes an aggregating computing device communications linked to the mote networks, such as the aggregating computing device 170 and its archival digital data storage device 190. The central computing devices of the three networks transmit the correlated mote data from their retained data storage to the aggregating computing device. The aggregating computing device receives and stores the correlated mote data from the three networks in an event-data archive on its associated digital data storage device, such as device 190. The event-data archive includes a data structure suitable for later search and retrieval. The event-data archive is subject to an information security measure that protects the mote data stored in the event-data archive from unauthorized access. The security measure is controlled by the aggregating computing device. The central computing devices delete the correlated mote data from their associated retained data storage after transmission to the aggregating computing device. This frees storage space for the constant stream of additional correlated mote data that is continuously transmitted by motes of their respective mote networks.

A requesting entity may be an employee or official of an owner or operator of one of the mote networks, or may be a potentially authorized person, machine, network or other entity. A requesting entity desiring mote data on an event, such as shooting, enters a gunshot target-event selection on a user input device of the aggregating computing device, and tenders an identification number as an access authorization. In this example, the gunshot (event 6 of FIG. 3) may have occurred near an intersection controlled by a city traffic light at a known date.

An event-data retrieval process operating on the aggregating computing device receives the target-event selection and the employee identification number. The process determines that the requesting entity is a trusted entity and possesses an access right. In response to the gunshot target-event selection, the event-data retrieval process automatically selects a pattern recognition criteria corresponding to at least one representative feature of a gunshot. Then, the event-data retrieval process in response to the gunshot input selection, automatically searches the event-data archive for instances of acoustic mote data correlating to the at least one representative feature of a gunshot on the known date. Correlating found instances of archived mote data are provided to the requesting entity, or a trusted third party selected by the requesting entity.

In further reference to FIG. 8, another embodiment provides a process that searches and retrieves certain instances of stored correlated mote data from an event-data archive. After a start block, the embodiment includes receiving an input selection from an input-selector, similar to the process 220 at block 222. The input selection corresponds to a target-occurrence having a representative feature. A filter corresponding to the representative feature of the target-occurrence is selected. A plurality of instances of occurrence data stored in a data set are filtered for data correlating to the target-occurrence representative feature a using the selected filter. Each instance of the stored occurrence data has a representative feature. An output responsive to the filtering is provided. The process then ends. The filtering step may further include automatically filtering the data stored in the data set. In a further embodiment, the output responsive to the filtering correlates to a target-occurrence representative feature, which is stored in another data set. Alternatively, in another embodiment, the output responsive to the filtering does not correlate to a target-occurrence representative feature. The non-correlating output is stored in anther data set.

Figure 9:
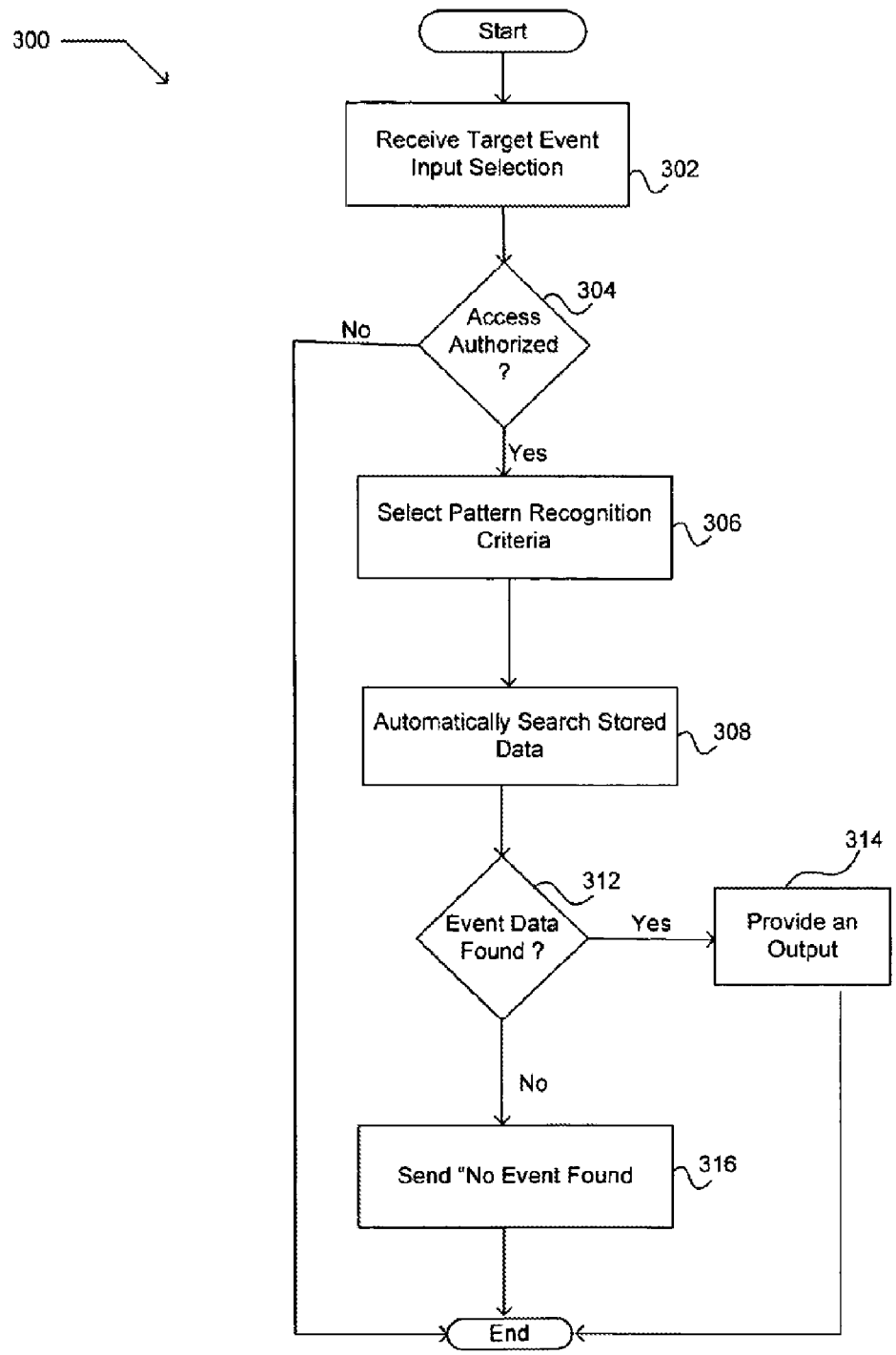
FIG. 9 is a flow diagram illustrating exemplary steps of a process that searches a plurality of instances of occurrence data stored in a data vault or data lock box and provides an output.

FIG. 9 is a flow diagram illustrating exemplary steps of a process 300 that searches a plurality of instances of event data stored in a data vault or data lock box and provides an output. Each instance of the event data has at least one representative feature, is stored in a digital data storage device, and is protected by an information security measure. The digital data storage device may be a local digital data storage device or a remote digital data storage device. The information security measure may be associated with the digital data storage device, the plurality of instances of stored event data, and/or a computing device having a communication link with the digital data storage device. In another embodiment, the digital data storage device includes a portable digital data storage device, such as an external hard drive, a DVD, a CD, a floppy disk, and a flash memory device. In a further embodiment, the event data includes mote data generated by a plurality of networked motes.

The process 300 is similar to the process 220. After a start block, the process 300 moves to block 302. At block 302, an input selection is received from an input selector, the input selection corresponding to a target-event having at least one representative feature. The received input selection further includes an output recipient selection and a tendered access authorization.

At block 304, in response to the tendered access authorization, a decision operation determines if an access right to the plurality of instances of stored event data protected by the information security measure is possessed by at least one of the input-selector and the recipient. If the decision operation determines that either the input-selector and/or the recipient are a trusted entity and posses an access right to the instances of stored event data, the process branches to block 306. If neither the input-selector nor the recipient is a trusted entity, the process branches to the end block. In an alternative embodiment, the input-selector and the recipient must each possess an access right.

At block 306, a pattern recognition criteria is selected corresponding to at least one representative feature of the target event. The criteria is selected in a manner substantially similar to block 128 described in conjunction with FIGS. 5A and 5B, and to block 226 described in conjunction with FIG. 8, including the alternative embodiments.

At block 308, in response to the input selection corresponding to the target event, the plurality of instances of stored event data are automatically searched for data correlating to the at least one target-event representative feature using the selected pattern recognition criteria.

At decision block 312, a decision operation determines if event data correlating to the at least one target-event representative feature was found. If the event data correlating to the target-event representative feature was not found, the process branches to block 316, where a message equivalent to "no data found" is provided. If event data correlating to the target was found, the process branches to block 314. At block 314, an output indicative of the result of the automatic search at block 308 is provided to the recipient.

In a further alternative embodiment of the process 300, the search at block 308 proceeds in response to an input-selector designation of a target tentative event-identifier in a substantially similar manner as the process 200 described in conjunction with FIG. 8.

The process 300, when implemented in a computing device, causes the computing device to perform certain steps. For example, in an embodiment where the process 300 is implemented in a computing device, such as the aggregating computing device 170 of FIG. 6, the instructions are typically stored in a computer readable media, such as the storage media and/or memory of the computing device, and loaded into memory for use.

Figure 10:
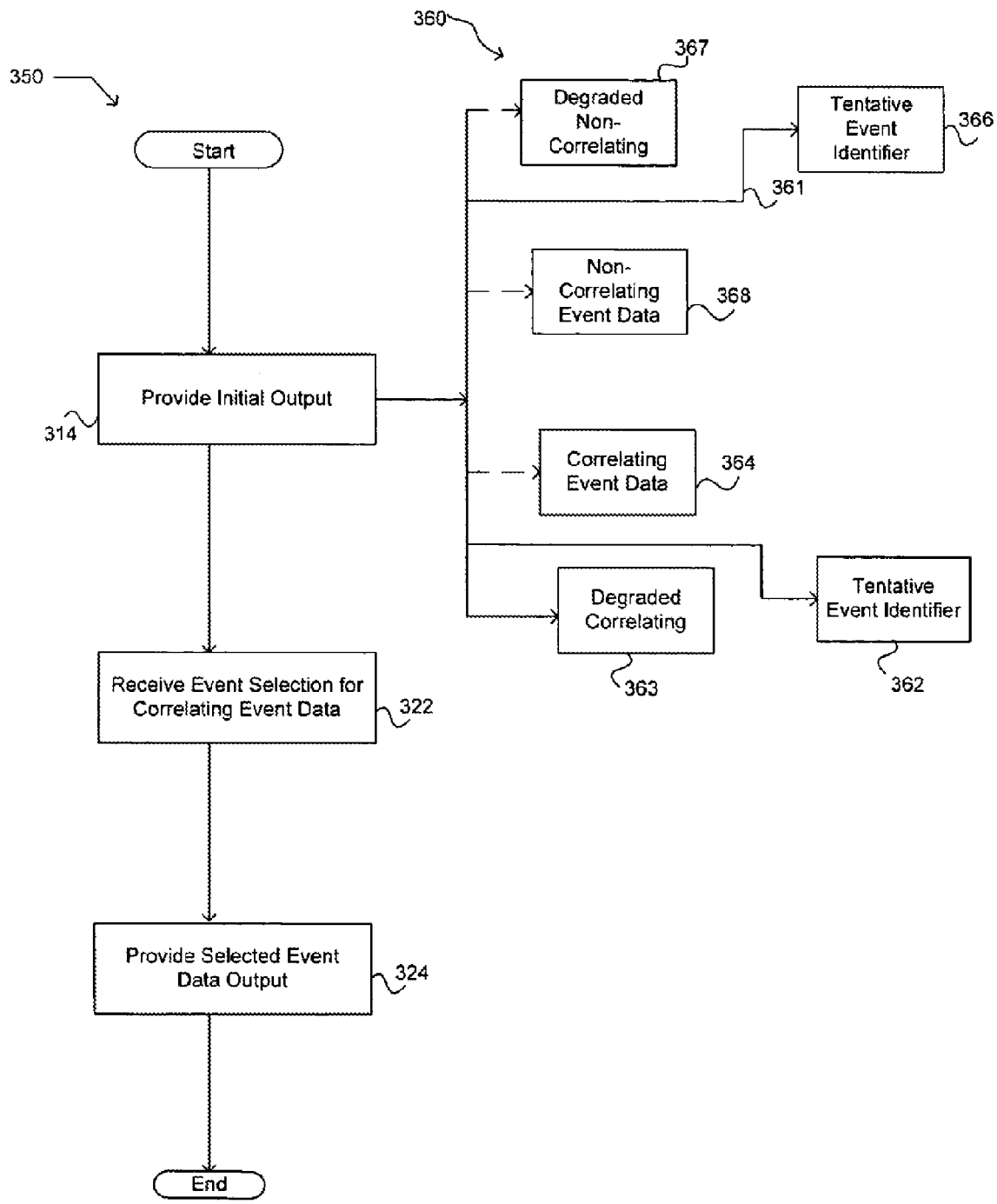
FIG. 10 is a flow diagram illustrating exemplary steps of a process providing the output of FIG. 9.

FIG. 10 is a flow diagram illustrating exemplary steps of a process 350 providing the output of the block 314 of FIG. 9. The illustrated embodiment includes a set of possible outputs 360 from the output at block 314. The set of possible outputs 360 illustrated in FIG. 10 includes a first subset of outputs for event data correlating to the target-event representative feature, and a second subset of outputs for event data not correlating to the target-event representative feature, i.e., non-correlating. The first subset includes a correlating tentative event-identifier 362, a degraded correlating event-data representation 363, and a correlating event data 364. The second subset includes a non-correlating tentative event-identifier 366, a degraded non-correlating event-data representation 367, and a non-correlating event data 368. The process 350 at block 314 includes a default configuration, indicated by solid hierarchal lines 361, that provides the correlating tentative event-identifier 362 and the non-correlating tentative event-identifier 366. In an alternative embodiment, the output configuration provides the degraded correlating event-data representation 363 and the degraded non-correlating event-data representation 367. In another alternative embodiment, the output configuration provides only the correlating event data 364.

At block 314, the initial output is provided to the input-selector and/or recipient in any manner and using any output device, such as being displayed on a monitor of a computing device. For example, the output may include displaying a table having columns that include an event data date, a tentative event identifier, and a correlating/non-correlating status. Individual instances of the plurality of instances of stored event data are individually displayed in rows of the table. For example, in response to a target-event selection of a gunshot, which is event 6 of FIG. 3, one row may display a date of May 17, 2004, a tentative event-identifier of a "gunshot," and a status of "correlating." Another row may display the same date of May 17, 2004, a tentative event-identifier of "unknown" because no correlation to a representative feature of a gunshot was found, and a status of "non-correlating." In an alternative embodiment, the output at block 314 may include a ranking for at least two instances of the correlating event data in a hierarchy of the found correlating event data. For example, if the provided output in the above example includes a plurality of events having "gunshot" tentative event-identifiers, the provided output may further include a relative or absolute ranking based on the acoustic intensity of the respective events as an aid to the recipient in evaluating the event data.

At block 322, an event-data selection is received from the input-selector, who may be the recipient. The selection corresponds to at least one of the instances of event data provided by the process at block 314 and requests provision of more detail related to the provided instances. In the default configuration, the input selection may correspond to a tentative event-identifier. For example, the input selection may request provision of degraded correlating event data corresponding to the event of May 17, 2004, and tentatively identified as gunshot.

At block 324, the selected event data is provided in a form of degraded correlating data. In an embodiment, the degraded correlating event data includes sufficient data for the recipient to make a preliminary determination whether the event appears to be a gunshot. For example the recipient may listen to the degraded data or view a display of a time-frequency analysis of the degraded data. The process 350 then terminates at the end block.

If the recipient possesses an access authorization for the correlating event data 364, the event-data selection may include receiving another input selection that requests that the correlating event-data be provided. The process at block 316 receives the another event-data selection, and at block 318 provides the output. Continuing with the above example, the recipient may request complete event data (364) from all the motes that correlates to the gunshot.

The process 350, when implemented in a computing device, causes the computing device to perform certain steps. For example, in an embodiment where the process 350 is implemented in a computing device, such as the aggregating computing device 170 of FIG. 6, the instructions are typically stored in a computer readable media, such as the storage media and/or memory of the computing device, and loaded into memory for use.

Figure 11:
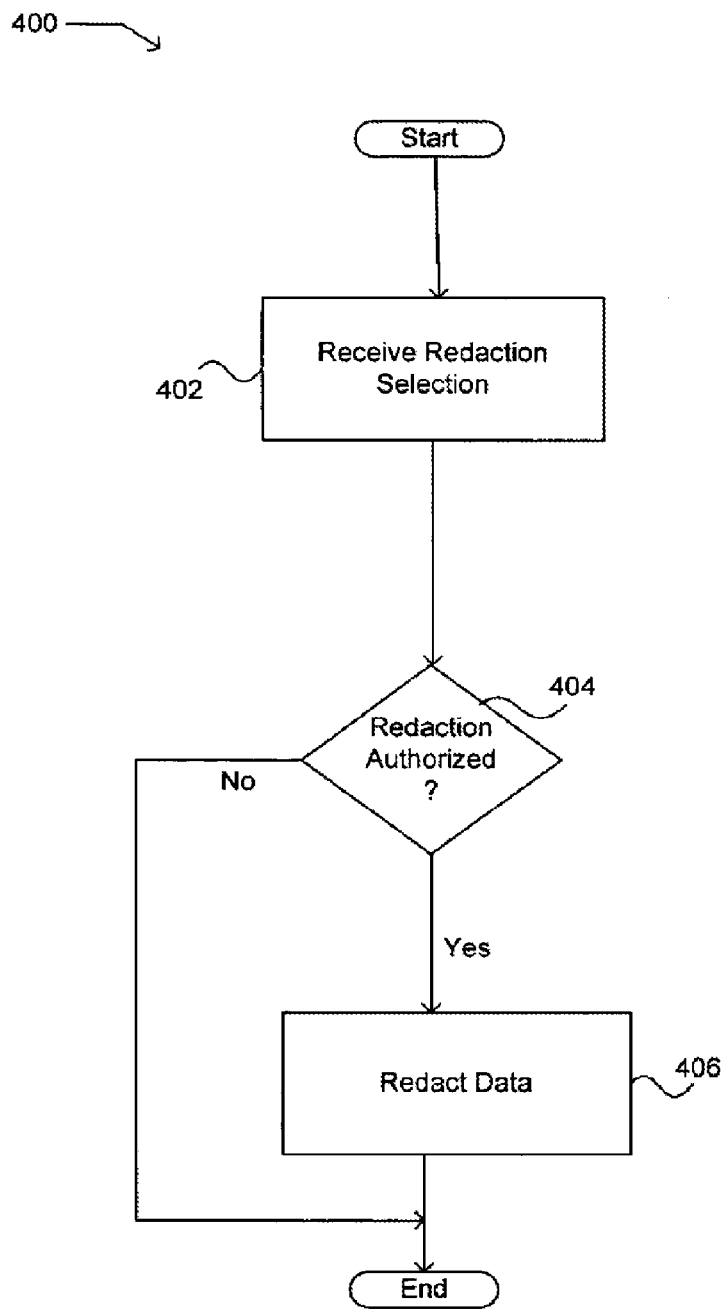
FIG. 11 is a flow diagram illustrating exemplary steps of a process that redacts a selected instance of occurrence data from the plurality of instances of stored occurrence data described in conjunction with FIG. 9.

FIG. 11 is a flow diagram illustrating exemplary steps of a process 400 that redacts a selected instance of event data from the plurality of instances of stored event data described in conjunction with FIG. 9. After a start block, the process moves to block 402, where a redaction selection and a tendered redaction authorization are received. The redaction selection includes a selection of at least one of the plurality of instances of event data. In an embodiment, the redaction selection may be correlated with the provided output at block 314 of FIGS. 9 and 10. Using the above example where a plurality rows are displayed in a table on a monitor, individual target-event-identifiers may be hyperlinked. This allows an input-selector to select an event for redaction by activating a link in a displayed row.

At block 404, in response to the tendered redaction authorization, a decision operation determines if at least one of the input-selector and the recipient possess a redaction right to the plurality of instances of stored event data protected by the information security measure. If the decision operation determines that either the input-selector and/or the recipient are a trusted entity and posses a redaction right, the process branches to block 406. If neither the input-selector nor the recipient is a trusted entity, the process branches to the end block.

At block 406, the selected event data is redacted from the plurality of instances of the stored event data. The redacted instance of event data may or may not correlate to the at least one target-event representative feature. The process 400 then terminates at the end block.

The process 400, when implemented in a computing device, causes the computing device to perform certain steps. For example, in an embodiment where the process 400 is implemented in a computing device, such as the aggregating computing device 170 of FIG. 6, the instructions are typically stored in a computer readable media, such as the storage media and/or memory of the computing device, and loaded into memory for use.

An exemplary system employing certain embodiments described in conjunction with FIGS. 9-11 may be illustrated using the exemplary system of the three network systems of distributed motes and the aggregating computing device previously described in conjunction with FIG. 8. Continuing with the previous illustration, the event-data archive associated with the aggregating computing device now contains correlating event data acquired from the three-network system over time, such as a year. The gunshot has resulted in litigation, and the litigants request discovery of correlating event data in the city's data vault, which is the city's event-data archive protected by a security measure. The city is willing to provide relevant instances event data to the litigants and a court, but unwilling to provide other instances of event data based on proprietary and citizen privacy concerns.

A trusted person designated by the court and given an access authorization by the city provides an input selection corresponding to the gunshot event of May 17, 2004. For example, the trusted person may be a neutral expert, an expert witness for a party, and a magistrate. The input selection is received by an archival event-data process described in conjunction with FIGS. 9-11, and a determination made that the trusted person acting as an input-selector possesses an access right to the data vault. In response to the gunshot target-event selection, the archival event-data retrieval process automatically selects a pattern recognition criteria corresponding to at least one representative feature of a gunshot. The archival event-data retrieval process, in response to the gunshot input selection, automatically searches the event-data archive for instances of acoustic mote data correlating to the at least one representative feature of a gunshot on the known date.

An initial output indicative of the search result is provided to the trusted person. In the exemplary embodiment, the default output configuration described above provides a table displaying the correlating tentative gunshot-identifiers (362) and the non-correlating tentative gunshot-identifiers (366) in rows. The trusted person provides an event-data selection that corresponds to at least one of the instances of tentative gunshot-identifiers initially provided by the process. For example, an initial output may indicate that a plurality of mote-generated acoustical data correlating to at least one representative feature of a gunshot, and the input selector selects three of these instances. The event-data selection is received from the input-selector, and the archival event-data retrieval process provides the trusted person with the three selected instances of degraded correlating event data corresponding to the gunshot. The trusted person listens to the three instances of degraded event data. If the trusted person concludes two of the three instances of event data relate to the gunshot, the trusted person then requests and is provided with the two complete event data for the two instances.

Another embodiment of the exemplary archival event-data process provides a redaction whereby the city through a representative, or the trusted person, may remove certain instances of event data from the plurality of instances of event data in the city's data vault. The redacted data vault may then be given to a third party much like a redacted paper document. Preferably, the city retains a duplicate of their data vault prior to beginning the redaction process. The process includes receiving the redaction selection from the trusted party, and a tender of a redaction authorization. For example, the redaction selection may be formulated in terms of redacting all event data except for the three selected instances of event data correlating to a gunshot. Alternatively, the redaction selection may be inverted to redact only the three selected instances of event data correlating to a gunshot. Since redaction involves alteration of data from the data vault, the city may require a separate redaction right in addition to the access right.

The process determines that the trusted party possesses a redaction right. In response to the redaction selection, all but the three instances of event data are redacted from the data vault. The data vault and the three selected instances of gunshot data stored therein may be made accessible to others involved in the litigation.

It should be appreciated that the particular embodiments described herein are merely possible implementations of the present disclosure, and that the present disclosure is not limited to the particular implementations described herein and shown in the accompanying figures. For example, in alternate implementations, certain acts need not be performed in the order described, and may be modified, and/or may be omitted entirely, depending on the circumstances. Moreover, in various implementations, the acts described may be implemented by a computer, controller, processor, programmable device, or any other suitable device, and may be based on instructions stored on one or more computer-readable media or otherwise stored or programmed into such devices. In the event that computer-readable media are used, the computer-readable media can be any available media that can be accessed by a device to implement the instructions stored thereon.

Various methods, systems, and techniques may be described and implemented in the general context of computer-executable instructions, such as program modules, executed by one or more processors or other devices. Generally, program modules include routines, programs, objects, components, data structures, etc. that perform particular tasks or implement particular abstract data types. Typically, the functionality of the program modules may be combined or distributed as desired in various alternate embodiments. In addition, embodiments of these methods, systems, and techniques may be stored on or transmitted across some form of computer readable media.

It may also be appreciated that there may be little distinction between hardware and software implementations of aspects of systems and methods disclosed herein. The use of hardware or software may generally be a design choice representing cost vs. efficiency tradeoffs, however, in certain contexts the choice between hardware and software can become significant. Those having skill in the art will appreciate that there are various vehicles by which processes, systems, and technologies described herein can be effected (e.g., hardware, software, firmware, or combinations thereof), and that a preferred vehicle may vary depending upon the context in which the processes, systems, and technologies are deployed. For example, if an implementer determines that speed and accuracy are paramount, the implementer may opt for a mainly hardware and/or firmware vehicle. Alternatively, if flexibility is paramount, the implementer may opt for a mainly software implementation. In still other implementations, the implementer may opt for some combination of hardware, software, and/or firmware. Hence, there are several possible vehicles by which the processes and/or devices and/or other technologies described herein may be effected, and which may be desired over another may be a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

Those skilled in the art will recognize that it is common within the art to describe devices and/or processes in the fashion set forth herein, and thereafter use standard engineering practices to integrate such described devices and/or processes into workable systems having the described functionality. That is, at least a portion of the devices and/or processes described herein can be developed into a workable system via a reasonable amount of experimentation.

The herein described aspects and drawings illustrate different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" (or "operatively connected," or "operatively coupled") to each other to achieve the desired functionality, and any two components capable of being so associated can also be viewed as being "operably couplable" (or "operatively couplable") to each other to achieve the desired functionality. Specific examples of operably couplable include but are not limited to physically mateable and/or physically interacting components and/or wirelessly interactable and/or wirelessly interacting components and/or logically interacting and/or logically interactable components.

Those skilled in the art will recognize that some aspects of the embodiments disclosed herein can be implemented in standard integrated circuits, and also as one or more computer programs running on one or more computers, and also as one or more software programs running on one or more processors, and also as firmware, as well as virtually any combination thereof. It will be further understood that designing the circuitry and/or writing the code for the software and/or firmware could be accomplished by a person skilled in the art in light of the teachings and explanations of this disclosure.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. For example, in some embodiments, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of this subject matter described herein. Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

As a further example of "open" terms in the present specification and claims, it will be understood that usage of a language construction "A or B" is generally interpreted as a non-exclusive "open term" meaning: A alone, B alone, and/or A and B together.

Although various features have been described in considerable detail with reference to certain preferred embodiments, other embodiments are possible. Therefore, the spirit or scope of the appended claims should not be limited to the description of the embodiments contained herein.

What is claimed is:

1. An occurrence-data archival system, comprising:
   a computing device operable to communicate with an archival data storage and with remote data storage devices; and
   instructions that cause the computing device to perform a process, including:
      receiving one or more mote data sets from at least one of the remote data storage devices, each respective mote data set of the one or more mote data sets representing a respective feature sensed by a given mote, the respective feature having a correlation to a reference as determined by the given mote, at least one instance of mote data of the received one or more mote data sets including an associated tentative occurrence-identifier having been assigned by the given mote, wherein the receiving includes:
         receiving at least a portion of multiple instances of mote data that were sensed by the given mote before or after the mote data that includes the associated tentative occurrence-identifier responsive to the assignment by the given mote of the associated tentative occurrence-identifier; and
      storing the received one or more mote data sets in the archival data storage.

2. The system of claim 1, wherein the reference of a first data set comprises a first occurrence.

3. The system of claim 2, wherein the reference of a second data set comprises a second occurrence.

4. The system of claim 3, wherein the first occurrence and the second occurrence are at least substantially the same.

5. A method implemented in a computing device, the method comprising:
   receiving a plurality of mote data sets from one or more remote data storage devices, each respective mote data set representing a respective feature sensed by one or more motes associated with at least one remote data storage device of the one or more remote data storage devices, the respective feature having a correlation to a reference as determined by at least a portion of the one or more motes, at least one instance of the received plurality of mote data sets including an associated tentative occurrence-identifier having been assigned by at least one mote of the one or more motes, wherein the receiving includes:
   receiving at least a portion of multiple instances of mote data that were sensed by the at least one mote before or after the at least one instance of the received plurality of mote data sets that includes the associated tentative occurrence-identifier responsive to the assignment of the associated tentative occurrence-identifier by the at least one mote;
storing the received plurality of mote data sets in a local data storage device; and
applying an information security measure to the stored plurality of mote data sets.

6. The method of claim 5, wherein the reference of a first data set comprises a first occurrence.

7. The method of claim 6, wherein the reference comprises a temporal reference related to the first occurrence.

8. The method of claim 6, wherein the reference of a second data set comprises a second occurrence.

9. The method of claim 8, wherein the reference of the second data set comprises a temporal reference related to the second occurrence.

10. The method of claim 5, wherein the reference of a first data set comprises a first occurrence; wherein the reference of a second data set comprises a second occurrence; and wherein the first occurrence and the second occurrence are at least substantially the same.

11. The method of claim 5, wherein the applying an information security measure to the stored plurality of mote data sets includes:
   protecting the stored plurality of mote data sets with the information security measure.

12. A machine-implemented method, comprising:
   receiving a target-occurrence having at least one representative feature;
   searching one or more instances of mote data for mote data correlating to the target-occurrence, each instance of mote data corresponding to at least one occurrence;
   assigning an associated tentative occurrence-identifier to at least one instance of the one or more instances of mote data if the at least one instance correlates with the target-occurrence;
   providing (i) the at least one instance of the one or more instances of mote data that correlates with the target-occurrence and (ii) the associated tentative occurrence-identifier to an occurrence-data archival system; and
   providing to the occurrence-data archival system at least a portion of multiple instances of mote data that are sensed before or after the at least one instance of the one or more instances of mote data that correlates with the target-occurrence responsive to the assigning of the associated tentative occurrence-identifier,
   wherein the receiving, the searching, the assigning, the providing (i) the at least one instance of the one or more instances of mote data, and the providing to the occurrence-data archival system at least a portion of multiple instances of mote data are performed by at least one machine that comprises one or more motes.

13. The method of claim 12, wherein the searching one or more instances of mote data for mote data correlating to the target-occurrence includes:
   correlating to the at least one representative feature of the target-occurrence.

14. The method of claim 12, wherein the searching one or more instances of mote data for mote data correlating to the target-occurrence includes:
   searching one or more instances of mote data, wherein at least one instance of mote data corresponds to an occurrence that includes a real world event.

15. The method of claim 12, wherein the searching one or more instances of mote data for mote data correlating to the target-occurrence includes:
   searching one or more instances of mote data, wherein at least one instance of mote data corresponds to an occurrence that includes a real world incident.

16. The method of claim 12, wherein the searching one or more instances of mote data for mote data correlating to the target-occurrence includes:
   searching one or more instances of mote data, wherein at least one instance of mote data corresponds to an occurrence that includes a change in a data sequence.

17. The method of claim 12, wherein the searching one or more instances of mote data for mote data correlating to the target-occurrence includes:
   searching one or more instances of mote data, wherein at least one instance of mote data corresponds to an occurrence that includes a change in a time domain.

18. The method of claim 12, wherein the searching one or more instances of mote data for mote data correlating to the target-occurrence includes:
   searching a first instance of mote data correlating to a respective first occurrence and a second instance of mote data correlating to a respective second occurrence.

19. The method of claim 12, wherein the searching one or more instances of mote data for mote data correlating to the target-occurrence includes:
   searching a first instance of mote data correlating to a first matter and a second instance of mote data correlating to a second matter.

20. The method of claim 12, wherein the receiving a target-occurrence having at least one representative feature includes:
   receiving a target-occurrence having at least one frequency characteristic.

21. The method of claim 12, wherein the receiving a target-occurrence having at least one representative feature includes:
   receiving a target-occurrence having at least one acoustic frequency characteristic.

22. The method of claim 12, wherein the receiving a target-occurrence having at least one representative feature includes:
   receiving a target-occurrence having at least one acoustic signature of a known event.

23. The method of claim 12, wherein the receiving a target-occurrence having at least one representative feature includes:
   receiving a target-occurrence having at least one light frequency characteristic.

24. The method of claim 12, wherein the receiving a target-occurrence having at least one representative feature includes:
   receiving a target-occurrence having at least one amplitude characteristic.

25. The method of claim 12, wherein the receiving a target-occurrence having at least one representative feature includes:
  receiving a target-occurrence having a frequency characteristic and an amplitude characteristic.

26. The method of claim 12, wherein the receiving a target-occurrence having at least one representative feature includes:
  receiving a target-occurrence having at least one magnetic characteristic.

27. The method of claim 12, wherein the receiving a target-occurrence having at least one representative feature includes:
  receiving a target-occurrence having at least one repetitive sequence.

28. The method of claim 12, wherein the receiving a target-occurrence having at least one representative feature includes:
  receiving a target-occurrence having at least one chronological sequence.

29. An occurrence-data archival system, comprising:
  a computing device operable to communicate with a local data storage and one or more remote data storages; and
  instructions that cause the computing device to perform a process including:
    receiving a plurality of instances of correlated mote data from the one or more remote data storages, each instance of mote data having been correlated to an occurrence by one or more motes, at least one instance of the received mote data including an associated tentative occurrence-identifier having been assigned by at least one mote, wherein the receiving includes:
      receiving at least a portion of multiple instances of mote data that were sensed by the at least one mote before or after the received mote data that includes the associated tentative occurrence-identifier responsive to the assignment by the at least one mote of the associated tentative occurrence-identifier; and
    storing the received plurality of instances of correlated mote data in the local data storage.

30. The system of claim 29, further including a local data storage device.

31. The system of claim 30, wherein the local data storage device is operable as an archival data storage.

32. The system of claim 29, wherein the correlated to an occurrence includes correlated to at least one representative feature of the occurrence.

33. The system of claim 32, wherein the at least one representative feature includes a sequence.

34. The system of claim 29, wherein the occurrence includes a real world event.

35. The system of claim 29, wherein the occurrence includes a real world incident.

36. The system of claim 29, wherein the plurality of instances of correlated mote data include a first instance of mote data correlated to a respective first occurrence and a second instance of mote data correlated to a respective second occurrence.

37. The system of claim 36, wherein the first instance of mote data of the respective first occurrence relates to a first matter and the second instance of mote data of the respective second occurrence relates to a second matter.

38. The system of claim 37, wherein the first and second matters are substantially similar.

39. The system of claim 29, wherein each instance of mote data of at least a portion of the plurality of instances of correlated mote data includes a respective sequence.

40. The system of claim 39, wherein at least one respective sequence includes a chronological sequence.

41. The system of claim 29, wherein each instance of mote data of at least a portion of the plurality of instances of correlated mote data was acquired by at least one mote of a plurality of distributed motes.

42. The system of claim 41, wherein each mote is part of a network of motes.

43. The system of claim 29, wherein at least one instance of the mote data of the plurality of instances of correlated mote data was acquired by a mote operable to sense at least one parameter.

44. The system of claim 29, further including an information security measure operable to protect the plurality of instances of correlated mote data stored in the local data storage.

45. The system of claim 44, wherein the information security measure protects by providing at least one item selected from a group comprising: information confidentiality, information integrity, and access control.

46. The system of claim 29, wherein the process further includes:
  deleting at least a portion of stored data from the one or more remote data storages responsive to the receiving a plurality of instances of correlated mote data.

47. The system of claim 29, wherein the associated tentative occurrence-identifier was assigned by the at least one mote in accordance with a method including:
  obtaining at least one representative feature of a target-occurrence;
  obtaining one or more pattern recognition criteria corresponding to the at least one representative feature of the target-occurrence;
  searching mote data for data correlating to the target-occurrence using the one or more pattern recognition criteria corresponding to the at least one representative feature of the target-occurrence; and
  if mote data correlating to the at least one representative feature of the target-occurrence is found, associating a tentative occurrence-identifier with the correlating mote data to produce correlated mote data that includes the associated tentative occurrence-identifier having been assigned by the at least one mote.

48. At least one mote comprising:
  at least one processor or logic circuit;
  at least one sensor element to obtain one or more instances of mote data; and
  one or more instructions to configure the at least one processor or logic circuit to implement a process including:
    receiving a target-occurrence having at least one representative feature;
    searching the one or more instances of mote data for mote data correlating to the target-occurrence, each instance of mote data corresponding to at least one occurrence;
    assigning an associated tentative occurrence-identifier to at least one instance of the one or more instances of mote data if the at least one instance correlates with the target-occurrence;
    providing (i) the at least one instance of the one or more instances of mote data that correlates with the target-occurrence and (ii) the associated tentative occurrence-identifier to an occurrence-data archival system; and providing to the occurrence-data archival system at least a portion of multiple instances of mote data that are sensed before or after the at least one instance of the one or more instances of mote data that correlates with the target-occurrence responsive to assignment of the associated tentative occurrence-identifier.

* * * * *